United States Patent
Bell

(10) Patent No.: US 9,174,830 B1
(45) Date of Patent: Nov. 3, 2015

(54) INDUSTRIAL VEHICLES WITH POINT FIX BASED LOCALIZATION

(71) Applicant: Crown Equipment Limited, East Tamaki, Auckland (NZ)

(72) Inventor: Mark Bell, Auckland (NZ)

(73) Assignee: Crown Equipment Limited, East Tamaki, Auckland (NZ)

(*) Notice: Subject to any disclaimer, the term of this patent is extended or adjusted under 35 U.S.C. 154(b) by 0 days.

(21) Appl. No.: 14/499,700

(22) Filed: Sep. 29, 2014

(51) Int. Cl.
*B66F 9/075* (2006.01)
*G05D 1/02* (2006.01)
*G05D 1/00* (2006.01)

(52) U.S. Cl.
CPC ............ *B66F 9/0755* (2013.01); *G05D 1/0094* (2013.01); *G05D 1/0246* (2013.01)

(58) Field of Classification Search
CPC ... B66F 9/0755; G05D 1/0246; G05D 1/0094
USPC .......................................................... 701/28
See application file for complete search history.

(56) References Cited

U.S. PATENT DOCUMENTS

| | | | |
|---|---|---|---|
| 4,773,018 A | 9/1988 | Lundstrom | |
| 4,790,402 A | 12/1988 | Field et al. | |
| 4,933,864 A | 6/1990 | Evans, Jr. et al. | |
| 4,947,094 A | 8/1990 | Dyer et al. | |
| 5,155,684 A | 10/1992 | Burke et al. | |
| 5,359,666 A | 10/1994 | Nakayama et al. | |
| 5,922,036 A | 7/1999 | Yasui et al. | |
| 6,459,955 B1 | 10/2002 | Bartsch et al. | |
| 6,732,826 B2 | 5/2004 | Song et al. | |
| 7,440,636 B2 | 10/2008 | Bober et al. | |
| 8,040,351 B1* | 10/2011 | Diard .............................. 345/426 |
| 8,160,744 B2 | 4/2012 | Nagasaka et al. | |
| 8,467,902 B2 | 6/2013 | Myeong et al. | |

(Continued)

FOREIGN PATENT DOCUMENTS

| CN | 102135429 A | 7/2011 |
|---|---|---|
| CN | 103020632 A | 4/2013 |

(Continued)

OTHER PUBLICATIONS

Facchinetti et al., "Using and Learning Vision-based Self-positioning for Autonomous Robot Navigation", ICARCV, 1994, wwwa.unine.ch.

(Continued)

*Primary Examiner* — Mary Cheung
*Assistant Examiner* — Anne Mazzara
(74) *Attorney, Agent, or Firm* — Dinsmore & Shohl LLP

(57) ABSTRACT

According to the embodiments described herein, an industrial vehicle can include a camera and one or more processors. The camera can capture an input image of ceiling lights of the ceiling of the warehouse. The one or more processors can execute machine readable instructions to detect transversal edges from the ceiling lights of the input image. The machine readable instructions executed by the one or more processors can determine points of convergence between the transversal edges and a first edge line and a second edge line. The machine readable instructions executed by the one or more processors can select a set of point fixes from the points of convergence. The machine readable instructions executed by the one or more processors can navigate the industrial vehicle through the warehouse utilizing the centerline and the set of point fixes.

20 Claims, 20 Drawing Sheets

(56) References Cited

U.S. PATENT DOCUMENTS

| | | | |
|---|---|---|---|
| 2005/0271248 A1* | 12/2005 | Teku et al. | 382/103 |
| 2010/0329513 A1 | 12/2010 | Klefenz | |
| 2012/0051595 A1 | 3/2012 | Lee et al. | |

FOREIGN PATENT DOCUMENTS

| | | |
|---|---|---|
| DE | 4429016 A1 | 2/1996 |
| DE | 102009004854 A1 | 7/2010 |
| DE | 102010008957 A1 | 8/2011 |
| DE | 102011115354 A1 | 4/2013 |
| EP | 0363339 A2 | 4/1990 |
| EP | 0364353 A1 | 4/1990 |
| EP | 0366350 A2 | 5/1990 |
| EP | 0 740 163 A2 | 10/1996 |
| EP | 2154478 A1 | 2/2010 |
| EP | 2385435 A1 | 11/2011 |
| EP | 2423772 A1 | 2/2012 |
| EP | 2549408 A1 | 1/2013 |
| GB | 2376537 A | 12/2002 |
| JP | H05257527 A | 10/1993 |
| JP | H06 243251 A | 9/1994 |
| JP | H07248822 A | 9/1995 |
| JP | 2004133567 A | 4/2004 |
| JP | 2012164229 A | 8/2012 |
| KR | 20080101131 A | 11/2008 |
| KR | 100877071 B1 | 1/2009 |
| KR | 20110004719 A | 1/2011 |
| KR | 20110009547 A | 1/2011 |
| KR | 20110033741 A | 3/2011 |
| KR | 20110049567 A | 5/2011 |
| KR | 20110054614 A | 5/2011 |
| KR | 20120088322 A | 8/2012 |
| KR | 20130022994 A | 3/2013 |
| KR | 20130043305 A | 4/2013 |
| WO | 0162446 A2 | 8/2001 |
| WO | 2008080606 A1 | 7/2008 |
| WO | 2010006352 A1 | 1/2010 |
| WO | 2013032192 A2 | 3/2013 |

OTHER PUBLICATIONS

Katz et al., "A Guidance Technique for an Automated Guided Vehicle", Int J Adv Manuf Technol, vol. 7, pp. 198-202, 1992.

King et al., "HelpMate autonomous mobile robot navigation system", Proc. SPIE 1388, Mobile Robots V. 190, Conference vol. 1388, Mar. 1, 1991 (Abstract).

Leonard et al., "Mobile Robot Localization by Tracking Geometric Beacons", IEEE Transactions on Robotics and Automation, vol. 7, No. 3, Jun. 1991.

Mesaki et al., "A New Mobile Robot Guidance System Using Optical Reflectors", Proceedings of the 1992 IEEE/RSJ International Conference on Intelligent Robotics and Systems, Jul. 7-10, 1992 (Abstract).

Niizuma et al., "Action-oriented sensor data integration and its application to control of an autonomous vehicle", IEEE Multisensor Fusion and Integration for Intelligent Systems, Oct. 2-5, 1994 (Abstract).

Takeda et al., "Automated vehicle guidance using spotmark", IEEE International Conference on Robotics and Automation, vol. 3, Apr. 1996 (Abstract).

International Search Report and Written Opinion dated Dec. 22, 2014 pertaining to International application No. PCT/US2014/058239.

Cui, S.Y. et al, Building Detection and Recognition from High Resolution Remotely Sensed Imagery, http://www.isprs.org/proceedings/XXXVII/congress/3b_pdf/79.pdf; Jul. 11, 2008; pp. 411-416.

* cited by examiner

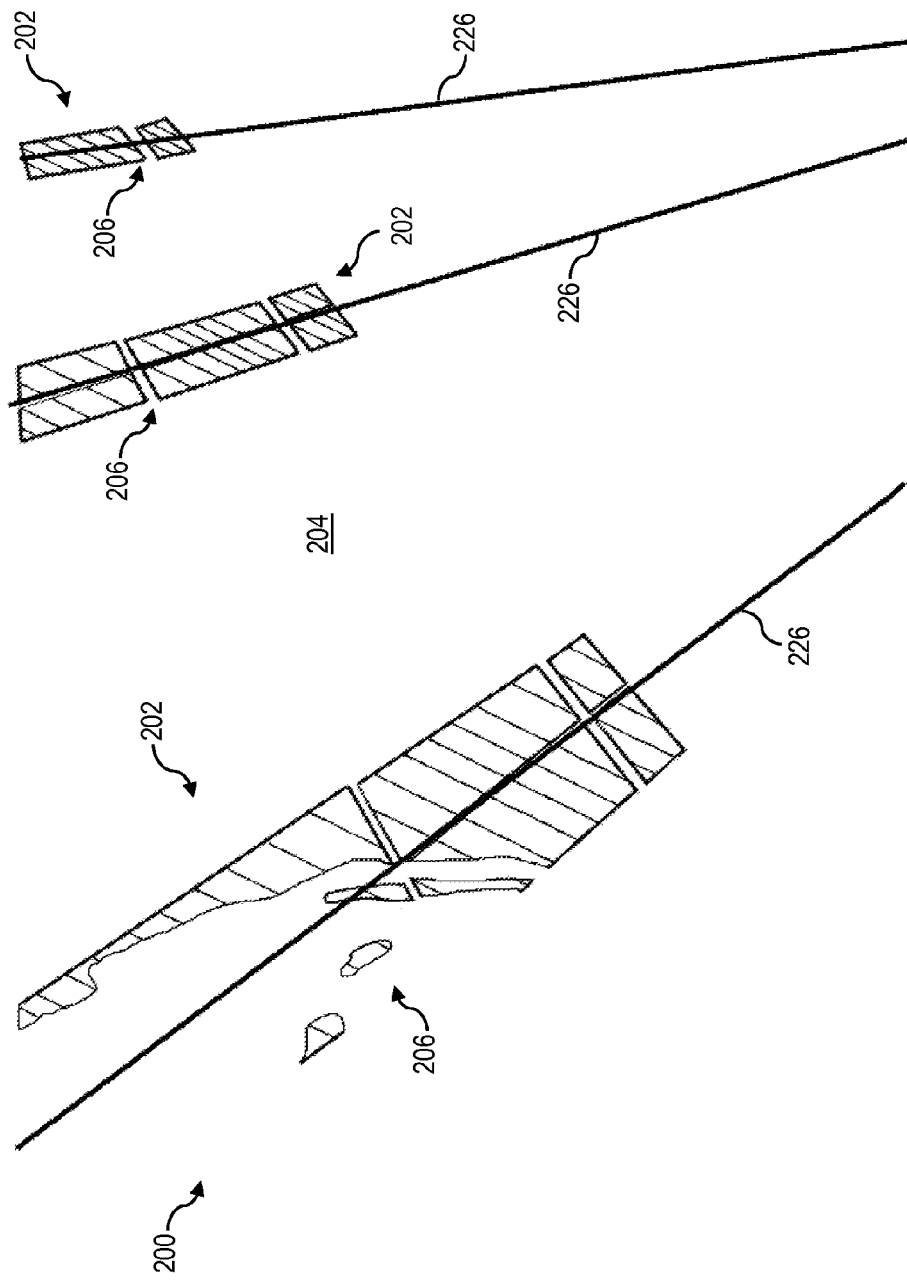

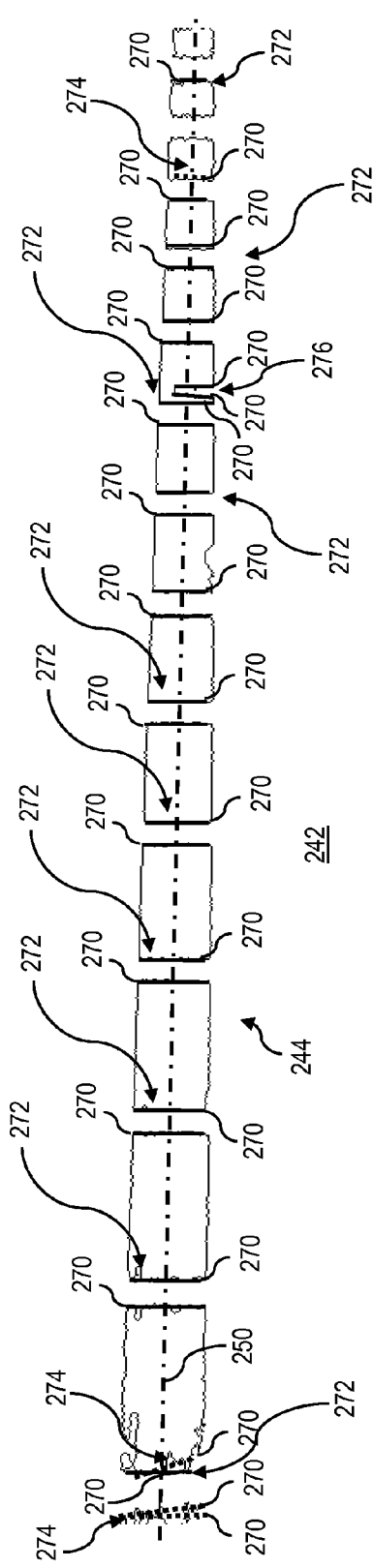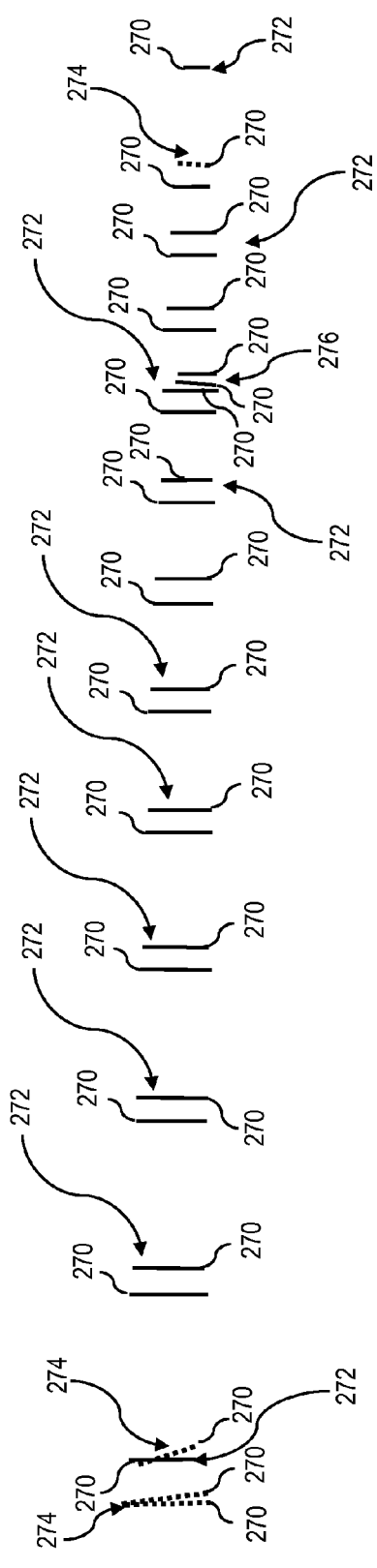
FIG. 17A
FIG. 17B

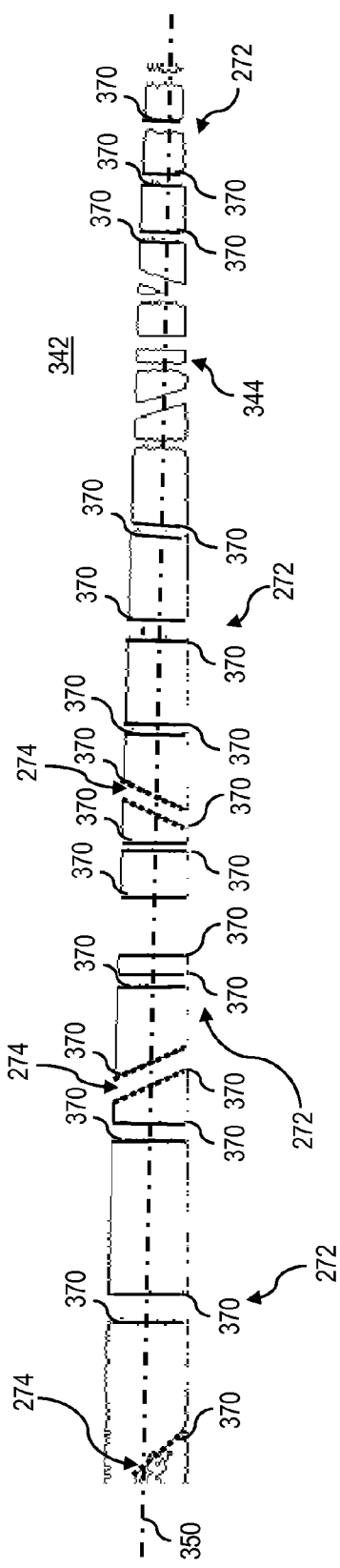
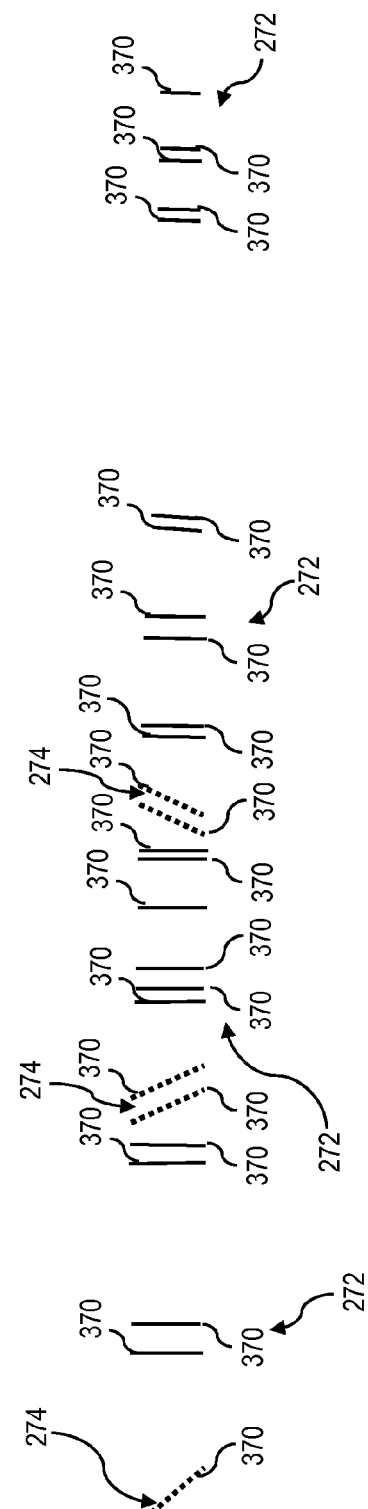
FIG. 18A
FIG. 18B

INDUSTRIAL VEHICLES WITH POINT FIX BASED LOCALIZATION

CROSS-REFERENCE TO RELATED APPLICATIONS

This application is related to U.S. application Ser. No. 14/499,721.

BACKGROUND

The present specification generally relates to systems and methods for providing point fix features of ceiling lights and, more specifically, to systems and methods for providing point fix features utilizing centerline features of ceiling lights.

In order to move items about an industrial environment, workers often utilize industrial vehicles, including for example, forklift trucks, hand and motor driven pallet trucks, and/or other materials handling vehicles. The industrial vehicles can be configured as an automated guided vehicle or a manually guided vehicle that navigates through the environment. In order to facilitate automated guidance, navigation, or both, the industrial vehicle may be adapted for localization within the environment. That is the industrial vehicle can be adapted with sensors and processors for determining the location of the industrial vehicle within the environment such as, for example, pose and position of the industrial vehicle. The sensors can be configured to detect objects in the environment and the localization can be dependent upon features extracted from such detected objects.

SUMMARY

In one embodiment, an industrial vehicle can include a camera and one or more processors. The camera can be communicatively coupled to the one or more processors. The camera can be mounted to the industrial vehicle and focused to a ceiling of a warehouse. The camera can capture an input image of ceiling lights of the ceiling of the warehouse. The one or more processors can execute machine readable instructions to provide a first edge line and a second edge line of the ceiling lights of the input image. The machine readable instructions executed by the one or more processors can provide a centerline of the ceiling lights of the input image. The centerline can be disposed between the first edge line and the second edge line of the ceiling lights. The machine readable instructions executed by the one or more processors can detect transversal edges from the ceiling lights of the input image. The machine readable instructions executed by the one or more processors can determine points of convergence between the transversal edges and the first edge line and the second edge line. The machine readable instructions executed by the one or more processors can select a set of point fixes from the points of convergence. The machine readable instructions executed by the one or more processors can navigate the industrial vehicle through the warehouse utilizing the centerline and the set of point fixes.

In another embodiment, a method for navigating an industrial vehicle can include capturing an input image of skylights of a ceiling of a warehouse. The input image can be captured with a camera coupled to an industrial vehicle. A first edge line and a second edge line can be extracted from the skylights of the input image. A centerline of the skylights can be determined from the first edge line and the second edge line of the skylights. The centerline can be disposed between the first edge line and the second edge line of the skylights. Transversal edges can be detected from the skylights of the input image. Points of convergence can be determined between the transversal edges and the first edge line and the second edge line of the skylights. A set of point fixes can be selected from the points of convergence. A pose of the industrial vehicle, a position of the industrial vehicle, or both can be determined based upon the centerline and the set of point fixes. The industrial vehicle can be navigated through the warehouse utilizing the pose, the position, or both.

In a further embodiment, a system can include an industrial vehicle, a camera, and one or more processors. The camera can be communicatively coupled to the one or more processors. The camera can be mounted to the industrial vehicle and focused to a ceiling of a warehouse. The camera can capture an input image of ceiling lights of the ceiling of the warehouse. The one or more processors can execute machine readable instructions to provide a first edge line and a second edge line of the ceiling lights of the input image. The machine readable instructions executed by the one or more processors can provide a centerline of the ceiling lights of the input image. The centerline can be disposed between the first edge line and the second edge line of the ceiling lights. The machine readable instructions executed by the one or more processors can detect transversal edges from the ceiling lights of the input image. The machine readable instructions executed by the one or more processors can determine points of convergence between the transversal edges and the first edge line and the second edge line. The machine readable instructions executed by the one or more processors can select a set of point fixes from the points of convergence. The machine readable instructions executed by the one or more processors can navigate the industrial vehicle through the warehouse utilizing the centerline and the set of point fixes.

According to any of the industrial vehicles, methods, or systems described herein the one or more processors can execute the machine readable instructions to set a region of interest that is coincident with a usable portion of the ceiling lights. The transversal edges can be detected from the usable portion of the ceiling lights. Alternatively or additionally, the region of interest can be a bounding box that is axis aligned with the centerline. Alternatively or additionally, the first edge line and the second edge line can be line segments demarcated by end points. The region of interest can be demarcated by one or more of the end points of the first edge line and the second edge line. Alternatively or additionally, the centerline can be demarcated by end points. The machine readable instructions executed by the one or more processors can project the end points of the centerline upon the first edge line and the second edge line to create intersection points. The region of interest can be demarcated by one or more of the intersection points. Alternatively or additionally, the first edge line and the second edge line can overlap to define an overlapping portion. The region of interest can be demarcated by the overlapping portion of the first edge line and the second edge line. Alternatively or additionally, the first edge line and the second edge line can converge at a vanishing point. The first edge line and the second edge line can be line segments demarcated by end points. The region of interest can be determined utilizing the vanishing point.

According to any of the industrial vehicles, methods, or systems described herein the transversal edges can be detected using a Hough transform.

According to any of the industrial vehicles, methods, or systems described herein the one or more processors can execute the machine readable instructions to determine an average angle of the transversal edges. The machine readable instructions executed by the one or more processors can remove unusable edges from the transversal edges that are outside of a restricted range of angles on either side of the average angle of the transversal edges. The usable edges of the transversal edges can remain. The set of point fixes can be selected from the usable edges of the transversal edges.

According to any of the industrial vehicles, methods, or systems described herein the points of convergence can be determined by extrapolating the transversal edges. Alternatively or additionally, the points of convergence can be determined by extrapolating the first edge line, the second edge line, or both. Alternatively or additionally, the set of point fixes can be selected from the transversal edges having a length ratio above threshold level. The length ratio can be given by a ratio of a length of each of the transversal edges to a length of a span between corresponding points of convergence.

According to any of the industrial vehicles, methods, or systems described herein the one or more processors execute the machine readable instructions to label a point fix of the set of point fixes as corresponding to a transition of dark-to-bright or bright-to-dark in the input image.

According to any of the industrial vehicles, methods, or systems described herein raw feature contours can be extracted from skylights of the input image. A convex hull can be determined from the skylights of the input image. The convex hull an include hull line segments. A mask can be generated from the hull line segments of the convex hull. A selected portion can be selected from the raw feature contours. The selected portion of the raw feature contours can be coincident with the mask. The first edge line and the second edge line can be extracted from the selected portion of the raw feature contours.

According to any of the industrial vehicles, methods, or systems described herein extracting the first edge line and the second edge line from skylights of the input image can include extracting line segments from the skylights of the input image. The first edge line can be selected from the line segments. The line segments can be weighted based at least in part upon overlap with the first edge line. The second edge line can be selected from the line segments based upon the weighting of the line segments.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 9A and 9B schematically depict centerline features overlaid upon the input image of FIG. 3 according to one or more embodiments shown and described herein;

FIGS. 17A and 17B schematically depict usable and unusable edges of the transversal edges of FIGS. 15A and 15B according to one or more embodiments shown and described herein;

FIGS. 18A and 18B schematically depict usable and unusable edges of the transversal edges of FIGS. 16A and 16B according to one or more embodiments shown and described herein.

DETAILED DESCRIPTION

The embodiments described herein generally relate to Environmental Based Localization techniques (EBL) for extracting features from overhead lighting including, but not limited to, skylights. The EBL may be used to localize and/or navigate an industrial vehicle through a building structure, such as a warehouse. Suitably, the overhead lighting may be mounted in or on a ceiling of a building. However, in some embodiments the lighting may also or alternatively be suspended from a ceiling or wall via suitable structure. In some embodiments, a camera can be mounted to an industrial vehicle (e.g., automated guided vehicle or a manually guided vehicle) that navigates through a warehouse. The input image can be any image captured from the camera prior to extracting features from the image.

Figure 1:
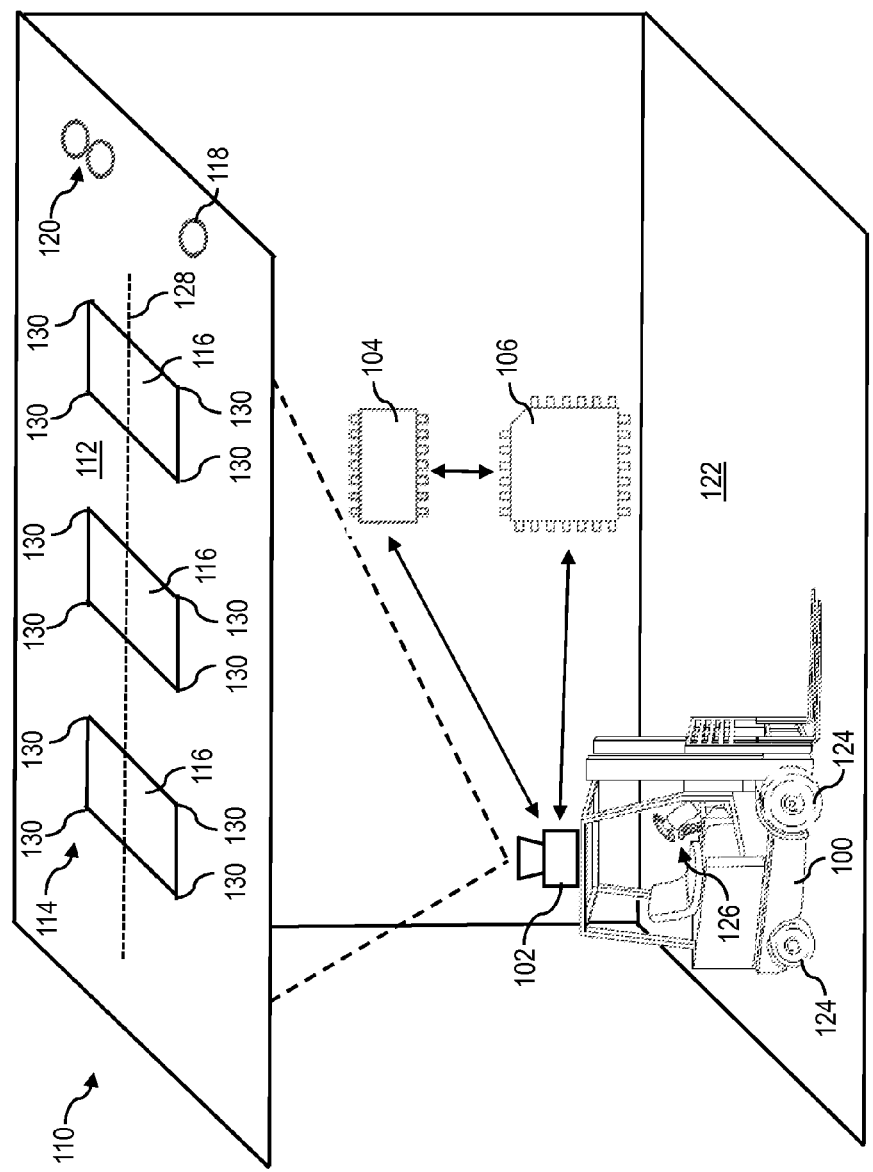
FIG. 1 depicts a vehicle for environmental based localization according to one or more embodiments shown and described herein.

Referring now to FIG. 1, a vehicle 100 can be configured to navigate through a warehouse 110. The vehicle 100 can comprise an industrial vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The industrial vehicle can be configured to automatically or manually navigate a surface 122 of the warehouse 110 along a desired path. Accordingly, the vehicle 100 can be directed forwards and backwards by rotation of one or more wheels 124. Additionally, the vehicle 100 can be caused to change direction by steering the one or more wheels 124. Optionally, the vehicle can comprise operator controls 126 for controlling functions of the vehicle such as, but not limited to, the speed of the wheels 124, the orientation of the wheels 124, or the like. The operator controls 126 can comprise controls that are assigned to functions of the vehicle 100 such as, for example, switches, buttons, levers, handles, pedals, input/output device, or the like. It is noted that the term "navigate" as used herein can mean controlling the movement of a vehicle from one place to another.

The vehicle 100 can further comprise a camera 102 for capturing overhead images. The camera 102 can be any device capable of capturing the visual appearance of an object and transforming the visual appearance into an image. Accordingly, the camera 102 can comprise an image sensor such as, for example, a charge coupled device, complementary metal-oxide-semiconductor sensor, or functional equivalents thereof. In some embodiments, the vehicle 100 can be located within the warehouse 110 and be configured to capture overhead images of the ceiling 112 of the warehouse 110. In order to capture overhead images, the camera 102 can be mounted to the vehicle 100 and focused to the ceiling 112. For the purpose of defining and describing the present disclosure, the term "image" as used herein can mean a representation of the appearance of a detected object. The image can be provided in a variety of machine readable representations such as, for example, JPEG, JPEG 2000, Exif, TIFF, raw image formats, GIF, BMP, PNG, Netpbm format, WEBP, raster formats, vector formats, or any other format suitable for capturing overhead objects.

The ceiling 112 of the warehouse 110 can comprise overhead lights such as, but not limited to, ceiling lights 114 for providing illumination from the ceiling 112 or generally from above a vehicle operating in the warehouse. The ceiling lights 114 can comprise substantially rectangular lights such as, for example, skylights 116, fluorescent lights, or the like; and may be mounted in or suspended from the ceiling or wall structures so as to provide illumination from above. As used herein, the term "skylight" can mean an aperture in a ceiling or roof fitted with a substantially light transmissive medium for admitting daylight, such as, for example, air, glass, plastic or the like. While skylights can come in a variety of shapes and sizes, the skylights described herein can include "standard" long, substantially rectangular skylights that may or may not be split by girders or crossbars into a series of panels. Alternatively, skylights can comprise smaller, discrete skylights of rectangular or circular shape that are similar in size to a bedroom window, i.e., about 30 inches by about 60 inches (about 73 cm by about 146 cm). Alternatively or additionally, the ceiling lights 114 can comprise substantially circular lights such as, for example, round lights 118, merged lights 120, which can comprise a plurality of adjacent round lights that appear to be a single object, or the like. Thus, overhead lights or "ceiling lights" include sources of natural (e.g. sunlight) and artificial (e.g. electrically powered) light.

The embodiments described herein can comprise one or more processors 104 communicatively coupled to the camera 102. The one or more processors 104 can execute machine readable instructions to implement any of the methods or functions described herein automatically. Memory 106 for storing machine readable instructions can be communicatively coupled to the one or more processors 104, the camera 102, or any combination thereof. The one or more processors 104 can comprise a processor, an integrated circuit, a microchip, a computer, or any other computing device capable of executing machine readable instructions or that has been configured to execute functions in a manner analogous to machine readable instructions. The memory 106 can comprise RAM, ROM, a flash memory, a hard drive, or any non-transitory device capable of storing machine readable instructions.

The one or more processors 104 and the memory 106 may be integral with the camera 102. Alternatively or additionally, each of the one or more processors 104 and the memory 106 can be integral with the vehicle 100. Moreover, each of the one or more processors 104 and the memory 106 can be separated from the vehicle 100 and the camera 102. For example, a server or a mobile computing device can comprise the one or more processors 104, the memory 106, or both. It is noted that the one or more processors 104, the memory 106, and the camera 102 may be discrete components communicatively coupled with one another without departing from the scope of the present disclosure. Accordingly, in some embodiments, components of the one or more processors 104, components of the memory 106, and components of the camera 102 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

As is noted above, the vehicle 100 can comprise or be communicatively coupled with the one or more processors 104. Accordingly, the one or more processors 104 can execute machine readable instructions to operate or replace the function of the operator controls 126. The machine readable instructions can be stored upon the memory 106. Accordingly, in some embodiments, the vehicle 100 can be navigated automatically by the one or more processors 104 executing the machine readable instructions. In some embodiments, the location of the vehicle can be monitored by the EBL as the vehicle 100 is navigated.

For example, the vehicle 100 can automatically navigate along the surface 122 of the warehouse 110 along a desired path to a desired position based upon a localized position of the vehicle 100. In some embodiments, the vehicle 100 can determine the localized position of the vehicle 100 with respect to the warehouse 110. The determination of the localized position of the vehicle 100 can be performed by comparing image data to map data. The map data can be stored locally in the memory 106, which can be updated periodically, or map data provided by a server or the like. Given the localized position and the desired position, a travel path can be determined for the vehicle 100. Once the travel path is known, the vehicle 100 can travel along the travel path to navigate the surface 122 of the warehouse 110. Specifically, the one or more processors 104 can execute machine readable instructions to perform EBL functions and operate the vehicle 100. In one embodiment, the one or more processors 104 can adjust the steering of the wheels 124 and control the throttle to cause the vehicle 100 to navigate the surface 122.

Figure 2:
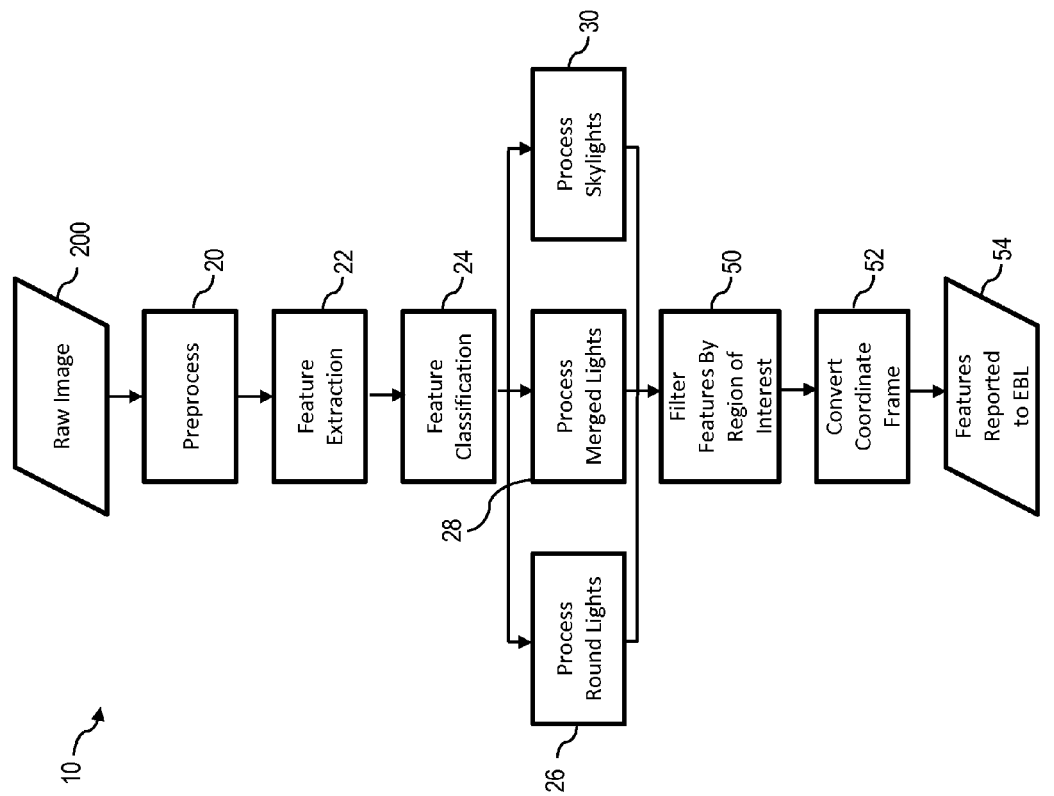
FIG. 2 depicts a flowchart of an exemplary algorithm for camera feature extraction/overhead lighting feature extraction for environmental based localization according to one or more embodiments shown and described herein.

Referring now to FIG. 2, a flow chart of a sequence of functions for a full Camera Feature Extraction (CFE) algorithm 10 is schematically depicted. It is noted that, while the functions are enumerated and depicted as being performed in a particular sequence in the depicted embodiment, the functions can be performed in an alternative order without departing from the scope of the present disclosure. It is furthermore noted that one or more of the functions can be omitted without departing from the scope of the embodiments described herein.

Figure 3:
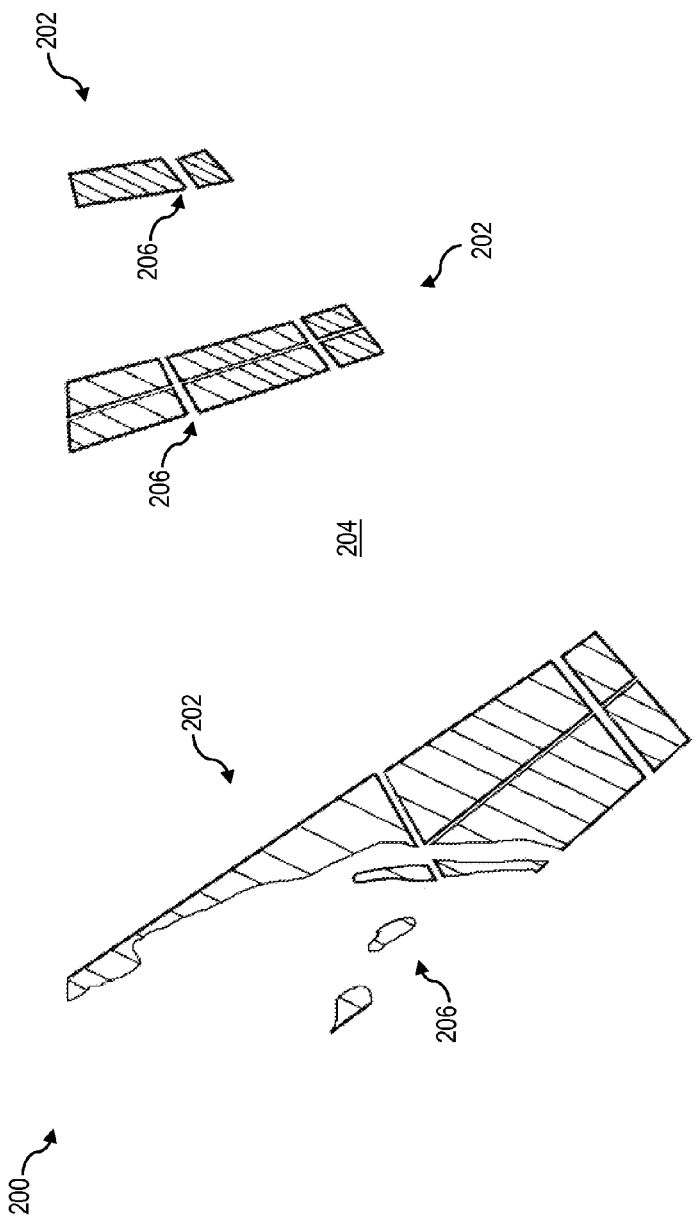
FIG. 3 schematically depicts an input image showing three skylights according to one or more embodiments shown and described herein.

Referring collectively to FIGS. 1-3, the CFE algorithm 10 can comprise a preprocess function 20 for processing the input image 200 of the ceiling 204 prior to executing further functions on the input image 200. The input image 200 is depicted as having captured a frame that includes skylights 202 corresponding to the skylights 116 of a warehouse 110. In some embodiments, the preprocess function 20 can comprise functions for the removal of lens distortion effects from the input image 200. Alternatively or additionally, the input image 200 can be captured by deliberately underexposing the input image 200 in order to highlight the ceiling lights 114, which can include skylights 116. It has been discovered that low exposure can aid in reducing reflections and other spurious artifacts, which can make the feature extraction processing more complicated and less reliable.

The CFE algorithm 10 can further comprise a feature extraction function 22 for extracting features from the input image 200 of the ceiling 204. The feature extraction function 22 can utilize one or more feature detection algorithms such as, for example, maximally stable extremal regions (MSER) algorithm, a thresholding step combined with Otsu's method to extract raw features (i.e. lights) from the image, or equivalent algorithms. Specifically, the extracted features from the input images 200 can be utilized by the localization process to determine the positions of ceiling lights 114 that are captured by the camera 102. For example, centroids can be extracted from round lighting features such as substantially circular shaped lights. Additionally, for smaller skylights the full extent of the smaller skylight can be captured within a single image frame. Accordingly, a centroid extraction function can be applied, as per substantially circular lights.

The CFE algorithm 10 can further comprise a feature classification function 24 for classifying the raw features 206 extracted from the input image 200 of the ceiling 204, by the feature extraction function 22, into multiple classifications. The feature classification function 24 can separate the raw features 206 into different classes in preparation for more specific processing. For example, merged lights can be differentiated from round lights by looking for objects with a longer major axis to minor axis ratio. Skylight panels can be differentiated from round lights based on size and circularity. Specifically, round lights generally form smaller and rounder blobs in the image than skylight panels. Sometimes smaller sections of skylights can appear broken up in an image in such a way that can lead to misclassification.

In the depicted embodiment, the raw features 206 can be classified into one of the following four classes: standard lights class (round lights), merged lights class, skylights class and noise class. The noise class label can be used to denote unwanted "false" features such as reflections. The raw features 206 classified as belonging to the noise class can be discarded after being classified by the feature classification function 24, i.e., not utilized by subsequent functions. Each of the other three classes can undergo separate processing to extract the desired feature information. As is explained in greater detail below, a point feature can be extracted from the raw features 206 of the standard lights class and the merged lights class, a line feature can be extracted from the skylights class, and, additionally or alternatively, a set of point fixes can be extracted from the skylights class. Each of the extracted features can be published to the EBL.

Specifically, the process round lights function 26 can find centroids of the raw features 206 of the standard lights class. Alternatively or additionally, the process merged lights function 28 can split a pair of lights that appear as merged in the input image 200 and find two centroids. The process skylights function 30 can take all extracted components belonging to the skylights class, group into skylights and find centerlines, as is explained in greater detail below. The filter features by region of interest function 50 can remove features outside of a defined region of interest. Accordingly, any remaining features, such as reflections from a truck mast, can be removed. The convert coordinate frames function 52 can convert feature coordinates from an image processing frame (e.g., origin in top-left corner) to EBL frame (e.g., origin in center of image) before the features reported 54 are published to the EBL.

Figure 4:
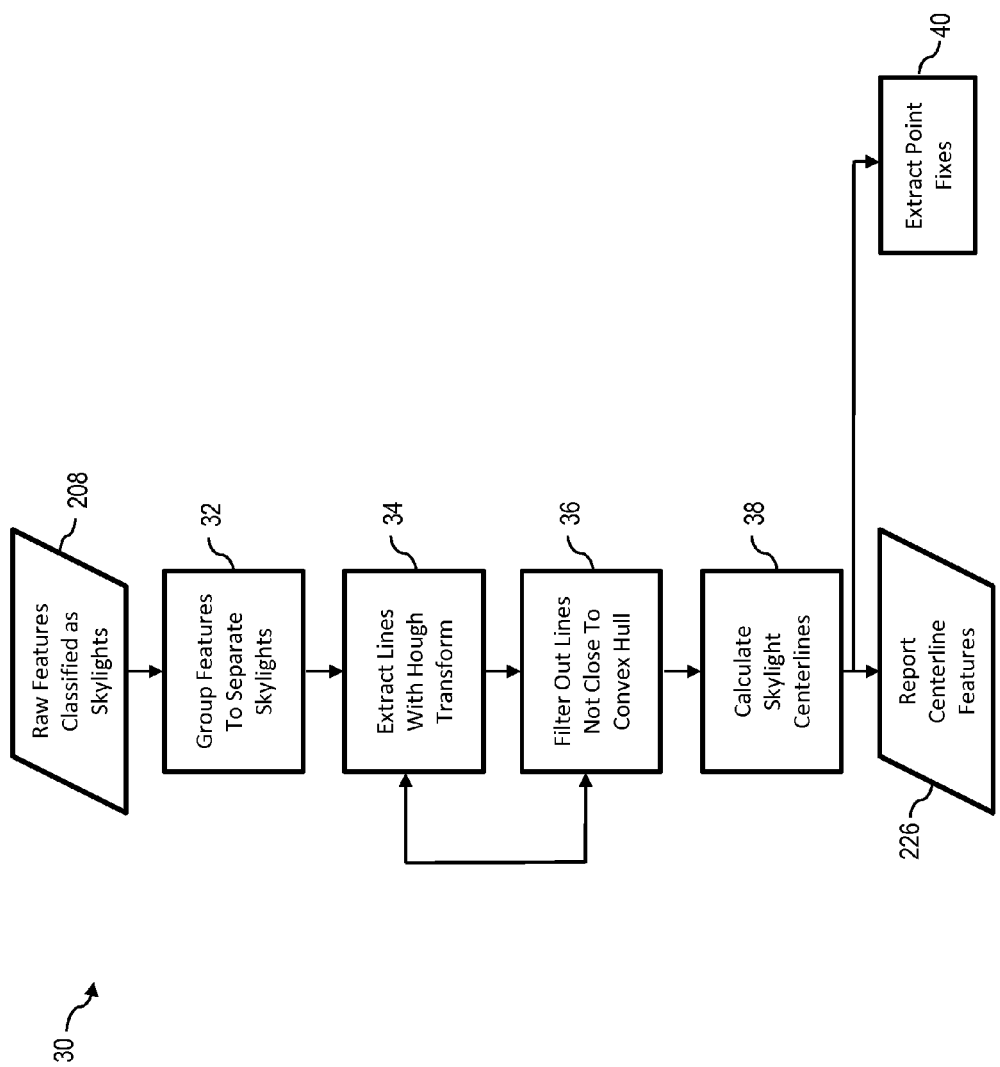
FIG. 4 depicts a flowchart of an exemplary algorithm for skylight extraction according to one or more embodiments shown and described herein.
Figure 5:
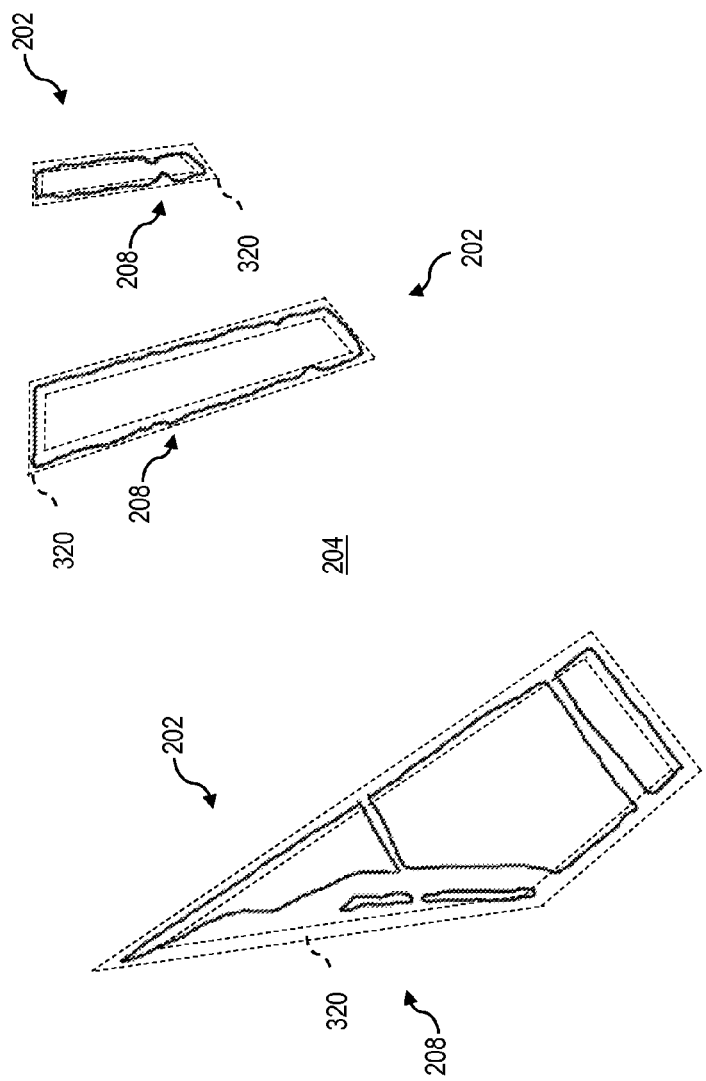
FIG. 5 schematically depicts raw feature contours of the three skylights of FIG. 3 according to one or more embodiments shown and described herein.

Referring collectively to FIGS. 3-5, a flow chart of a sequence of functions for the process skylights function 30 is schematically depicted. It is noted that, while the functions are enumerated and performed in a particular sequence in the depicted embodiment, the functions can be performed in an alternative order without departing from the scope of the present disclosure. Specifically, in some embodiments, it may be desirable to switch the order of the feature extraction function 34 and the filtering function 36. It is furthermore noted that one or more of the functions can be omitted without departing from the scope of the embodiments described herein. Input to the process skylights function 30 can be raw feature contours 208, which can comprise the raw features 206 of the input image 200 that were classified as belonging to the skylights class. Output from the process skylights function 30 can be a set of centerline 226 features. In some embodiments, the centerlines 226 can be defined as coordinates in Hough space (i.e., polar coordinates). It is preferred to have one centerline 226 reported for every unique instance of a skylight 202 captured in the input image 200.

Figure 6:
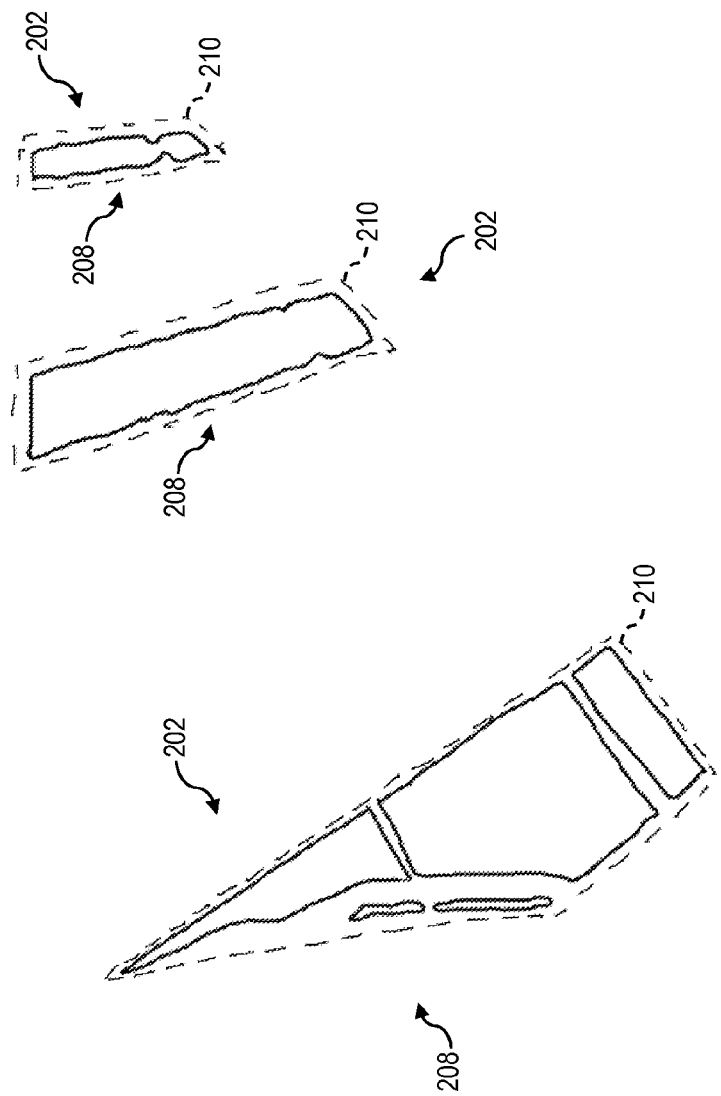
FIG. 6 schematically depicts the raw features of FIG. 5 grouped into separate groups corresponding to each skylight of FIG. 3 according to one or more embodiments shown and described herein.

Referring collectively to FIGS. 4 and 6, the process skylights function 30 can comprise a grouping function 32 for associating the raw feature contours 208 with a skylight 202. The grouping function can comprise any algorithm capable of repeatable association with raw feature contours 208 with its skylight 202. In one embodiment, a distance threshold can be utilized to group together the raw feature contours 208 based upon relative proximity. As a raw feature contour 208 may be a complicated shape, oriented minimum bounding rectangles of the raw feature contours 208 can be calculated first for each contour and inter-feature distances for grouping can be calculated from the minimum bounding rectangles.

Accordingly, the raw feature contours 208 can be grouped to separate the raw feature contours 208 based upon their associated skylight. Applicants have discovered that variation due to natural illumination can cause inconsistency in the images, i.e., panels may not break up in a consistent manner. Accordingly, the centerlines 226 can be determined based upon "complete" skylights, as represented by the raw feature contours 208 that are grouped, and not features for each individual panel. In some embodiments, the raw feature contours 208 can be grouped into feature groups 210 of one group per skylight 202. Specifically, since the input image 200 (FIG. 3) comprises three skylights 202, the raw feature contours can be grouped into three of the feature groups 210 that have been located by the grouping function 32.

Figure 7:
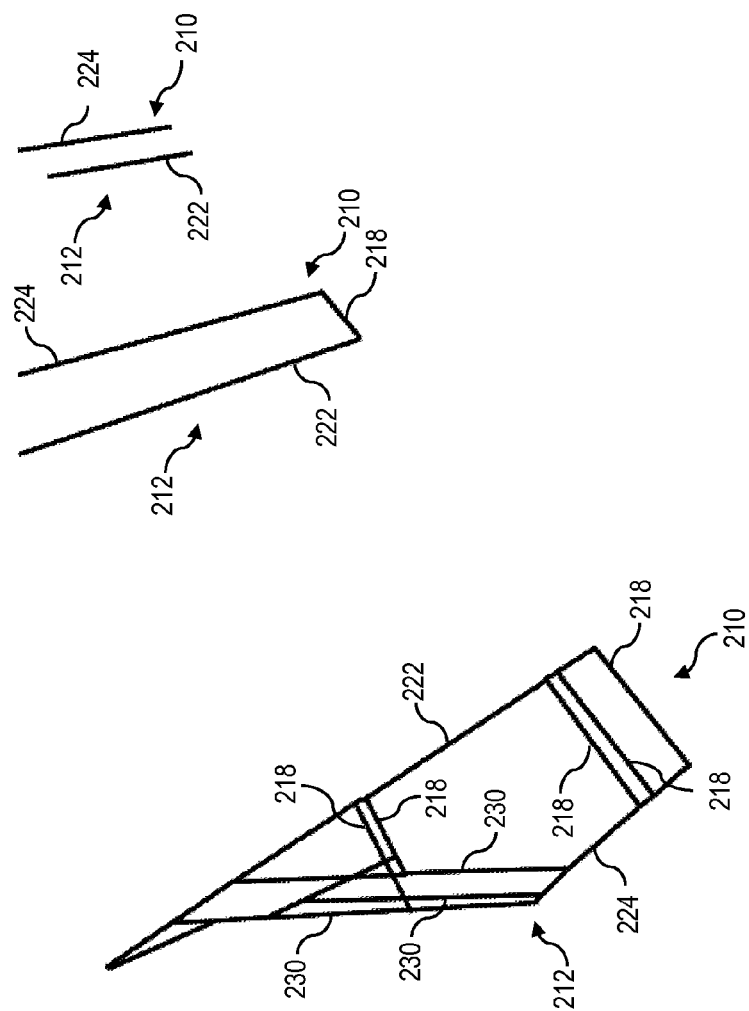
FIG. 7 schematically depicts line segments extracted from the groups of raw features of FIG. 5 using a feature extraction technique according to one or more embodiments shown and described herein.

Referring collectively to FIGS. 4 and 7, the process skylights function 30 can comprise a feature extraction function 34 for extracting line segments 212 from the raw feature contours 208. The line segments 212 can be associated with each of the feature groups 210 of raw feature contours 208. In some embodiments, feature extraction function 34 can comprise a feature extraction algorithm that can transform each of the feature groups 210 of raw feature contours 208 separately, i.e., one group at a time, into line segments 212 associated with the feature group 210 that the line segments 212 are extracted from. In some embodiments, a Hough transform can be performed on each of the feature groups 210 of raw feature contours 208 separately to identify the line segments 212 associated with each skylight 202. Each of the line segments 212 can be represented by two end points. When the line segments 212 are returned from the Hough transform, the line segments 212 can be ranked in order of strength, i.e., the more pixels in a line or the longer the line, the higher the line will be ranked in the Hough transform. It has been discovered that, due to the effects of perspective distortion and occlusions, the higher ranked of the line segments 212 may not correspond to the "correct" edge lines. For example, the higher ranked of the line segments 212 may be the perpendicular intersecting lines 218 arising from the girders between panels. In order to increase the likelihood of extracting the correct centerlines, a filtering function 36 can be utilized to filter out some of the non-desirable lines that were returned from the transform.

Figure 8:
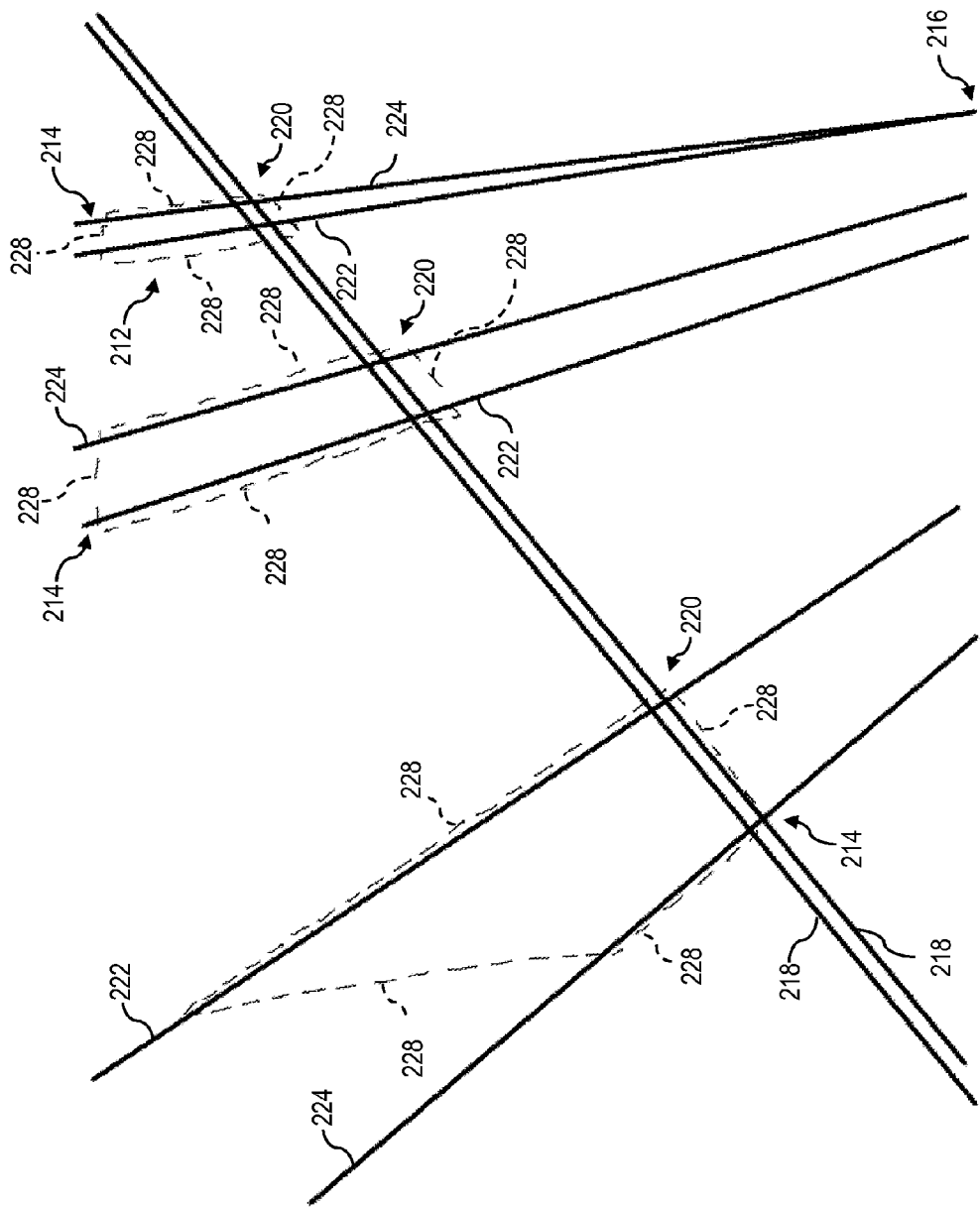
FIG. 8 schematically depicts selected line segments from FIG. 7 converted to "infinite" lines according to one or more embodiments shown and described herein.

Referring collectively to FIGS. 4, 6 and 8, the process skylights function 30 can comprise a filtering function 36 for selecting a preferred set of lines 214 from the line segments 212 of the feature groups 210. For example, after determining the feature groups 210 of line segments 212, the preferred set of lines 214 can be selected using a computational geometry algorithm such as, for example, algorithms for solving static problems or the like. In one embodiment, a convex hull algorithm can be utilized to select the preferred set of lines 214. It has been discovered that the use of convex hull algorithms in combination with Hough transforms can significantly improve the ability of the CFE algorithm 10 (FIG. 2) to isolate the "correct" edge lines for use in determining centerline features. Accordingly, the accuracy of centerline determination and any localization using centerline features can be improved.

In some embodiments, the convex hull 220 of the feature groups 210 of raw feature contours 208 (e.g., a skylight group of end points, or the like) can be found. The convex hull 220 can be a convex set that contains the raw feature contours 208 such as, for example, the global minimum convex set or local minimum convex set as determined by a convex hull algorithm. The convex hull 220 of the feature groups 210 of raw feature contours 208 can comprise an ordered list of points, which can be referred to as the convex hull points A, B, C, D.

In some embodiments, the convex hull points can be iterated through to determine hull line segments 228 that make up the convex hull 220, i.e., hull point A and hull point B can make a hull line segment 228, hull point B and hull point C can make a hull line segment, hull point C and hull point D can make a hull line segment 228, hull point D and hull point A can make a hull line segment 228, and so on. The hull line segments 228 can be converted into Hough space (i.e., polar) coordinates.

Reference is now made to FIGS. 6 through 8 collectively. The hull line segments 228 of the convex hull 220 can be compared (preferably in Hough space) with line segments 212 associated with the feature group 210 of raw feature contours 208. Any of the line segments 212 from the feature group 210 that are not within a certain threshold of similarity to a hull line segment 228 of the convex hull 220 in Hough space coordinates can be discarded to leave a preferred set of lines. It is noted that the majority of the diagonal lines 230 and perpendicular intersecting lines 218 of the feature groups 210 have been removed. Alternatively or additionally, the line segments 212, which can be represented by two end points, can be converted to "infinite" lines, i.e., lines represented in Hough space by coordinates $\rho$ and $\theta$ without defined end points.

Referring collectively to FIGS. 4, 5 and 8, in some embodiments, the feature extraction function 34 and the filtering function 36 of the process skylights function 30 can be reversed as indicated by the arrow in FIG. 4. Accordingly, the convex-hull based filtering described with respect to filtering function 36 can be performed prior to extracting lines from the raw feature contours 208. The hull line segments 228 can be utilized to select raw feature contours 208 for use by the feature extraction function 34. For example, the hull line segments 228 of the convex hull 220 can be transformed by a morphological operation such as, but not limited to, a dilation operation, to create a mask 320 (depicted as a dashed region in FIG. 5). The portion of the raw feature contours 208 that are coincident with the mask 320 can be selected as input to the feature extraction function 34. The line segments 212 can be extracted from the selected portion of the raw feature contours 208 such as, for example, via a Hough transform. Additionally, the first edge line 222 and the second edge line 224 can be selected from the line segments 212 extracted from the selected portion of the raw feature contours 208. Thus, the reverse order of the feature extraction function 34 and the filtering function 36 can yield the same results as the original order by limiting the number of "non-desirable" lines returned by the feature extraction function 34. Moreover, an overall improvement to computational efficiency of the process skylights function 30 can be achieved when applying the feature extraction function 34 to a reduced quantity of pixels compared to the full quantity of pixels of the raw feature contours 208.

Referring collectively to FIGS. 2, 4, and 7, it is noted that in some embodiments, the filtering function 36 may be unnecessary. For example, when the distance from the camera 102 to the ceiling 112 is sufficiently large, it has been discovered by the applicants that the input image 200 may have reduced perspective distortion. Consequently, the perpendicular intersecting lines 218 from the girders between panels may not be detected by the feature extraction function 34 because the perpendicular intersecting lines 218 may appear much shorter than the long "correct" edges in the input image 200.

Referring collectively to FIGS. 2, 4, and 7-9B, the process skylights function 30 can comprise a centerline calculating function 38 for selecting two edge lines from each feature group 210 corresponding to a skylight 202 and calculating a centerline 226 from the selected edge lines. Specifically, a first edge line 222 and a second edge line 224 can be selected and utilized to derive the centerline 226 for each skylight 202. After the preferred set of lines 214 has been selected, the highest ranked of the line segments 212 remaining in the preferred set of lines 214 can be selected as the first edge line 222. As the Hough space coordinates of the first edge line 222 can be known, the preferred set of lines 214 can be searched from high rank to low rank to find a second edge line 224 from the line segments 212 with similar enough angle θ to the first edge line 222. Since, in some embodiments, the filtering function 36 may be unnecessary, the first edge line 222 and the second edge line 224 can be selected, as described above, directly from the feature group 210 of line segments 212.

In some embodiments, a distance threshold can be utilized to ensure that the second edge line 224 is selected away from the first edge line 222 in Hough space, i.e., to avoid selecting a similar line derived from a duplicate feature. Specifically, applicants have discovered that multiple similar lines can be returned from the Hough transform on a single edge. Accordingly, the highest ranked of the line segments 212 that meets the similarity criteria can be chosen as the second edge line 224.

Figure 9B:
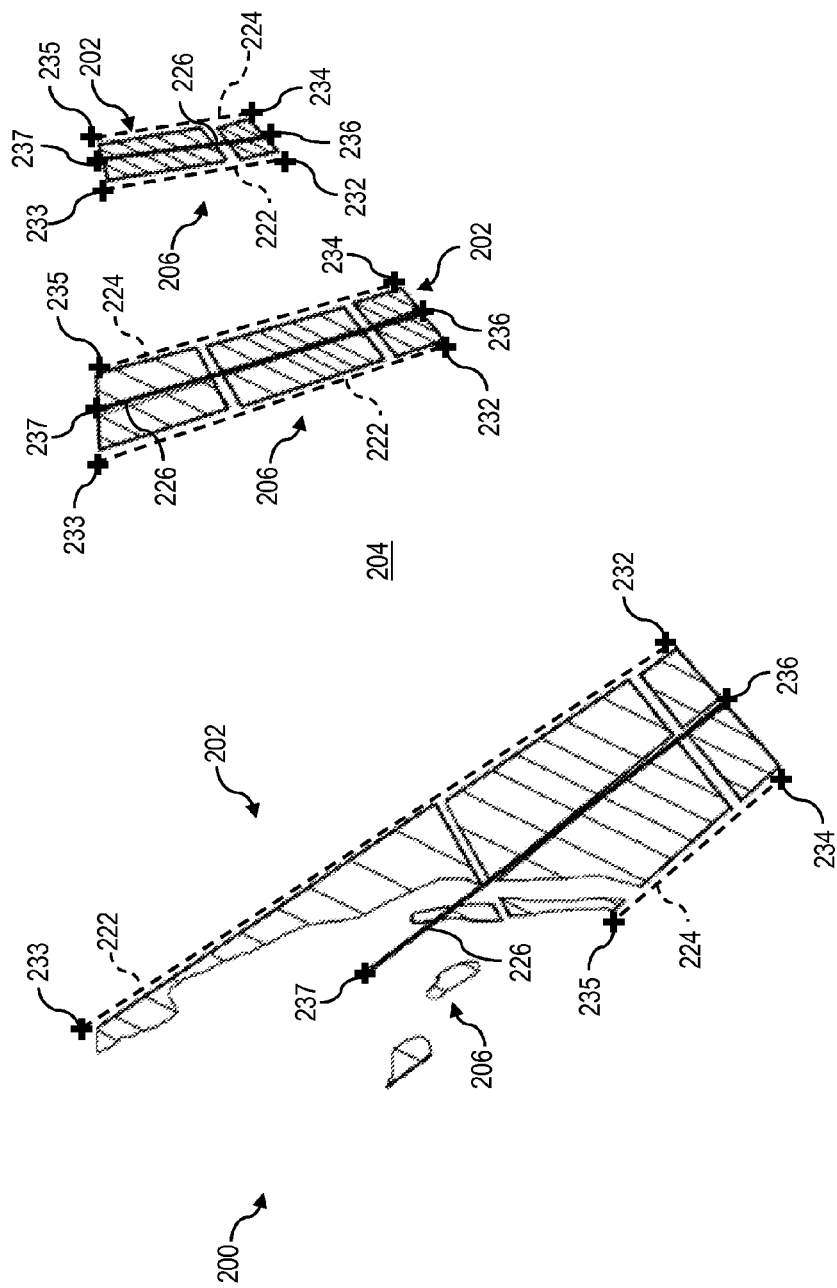

The centerline 226 can be calculated based upon the first edge line 222 and the second edge line 224. For the sake of clarity, it is noted that each of the first edge line 222 and the second edge line 224 can be provided as a line segment (FIGS. 7 and 9B) or as an infinite line (FIGS. 8 and 9A). When the centerline 226 is provided as an infinite line, the centerline 226 can be located by finding a vanishing point 216 where the first edge line 222 and the second edge line 224 converge. A line of bisection can be calculated using the Hough space coordinates of the vanishing point 216, the first edge line 222 and the second edge line 224. The line of bisection can be utilized as the centerline 226. The centerlines 226, which are depicted as being overlaid upon the input image 200 in FIG. 9A, can be reported to EBL.

Referring to FIG. 9B, when provided as a line segment, the first edge line 222 can be demarcated by a first end point 232 and a second end point 233. Similarly, the second edge line 224 can be a line segment demarcated by a first end point 234 and a second end point 235. In some embodiments, the first end point 232 and the second end point 233 of the first edge line 222 and the first end point 234 and the second end point 235 of the second edge line 224 can be utilized to determine the centerline 226. For example, the first end point 232 and the second end point 233 of the first edge line 222 can be associated with the first end point 234 and the second end point 235 of the second edge line 224 by their respective proximity. The first end point 232 of the first edge line 222 can be paired with the first end point 234 of the second edge line 224, which is nearer to the first end point 232 of the first edge line 222 than the second end point 235 of the second edge line 224. Similarly, the second end point 233 of the first edge line 222 can be paired with the second end point 235 of the second edge line 224, which is nearer to the second end point 233 of the first edge line 222 than the first end point 234 of the second edge line 224. Alternatively or additionally, the end points of the first edge line 222 and the second edge line 224 can be paired based upon proximity to the vanishing point 216 (FIG. 8). Specifically, the nearest endpoints to the vanishing point 216 can be paired and the furthest end points from the vanishing point 216 can be paired. Accordingly, the first end point 232 of the first edge line 222 can be paired with the first end point 234 of the second edge line 224 and the second end point 233 of the first edge line 222 can be paired with the second end point 235 of the second edge line 224.

The centerline 226 can be determined from the paired end points. Specifically, the centerline 226 can be a line segment demarcated by a first end point 236 and a second end point 237. The first end point 236 of the centerline 226 can be determined from the first end point 232 of the first edge line 222 and the first end point 234 of the second edge line 224, which as noted above can be paired. The second end point 237 of the centerline 226 can be determined from the second end point 233 of the first edge line 222 and the second end point 235 of the second edge line 224, which can also be paired. In some embodiments, the first end point 236 and the second end point 237 of the centerline 226 can be determined by averaging each of the respective pairs of end points of the first edge line 222 and the second edge line 224.

Referring collectively to FIGS. 8-9B, the centerline 226, the first edge line 222, the second edge line 224, the corresponding Hough coordinates (for infinite lines), the corresponding end points (for line segments), or combinations thereof of each of the feature groups can be associated with one of the skylights, and the EBL can be utilized to provide features for navigation of the vehicle or can be presented by a display communicatively coupled to the EBL. It is noted that there are a number of parameters (e.g. thresholds) that can be configured for each function of the CFE algorithm according to the particular site that is being navigated by the vehicle. Accordingly, the embodiments described herein can further include a calibration stage for determining the precise values for the parameters.

Figure 10:
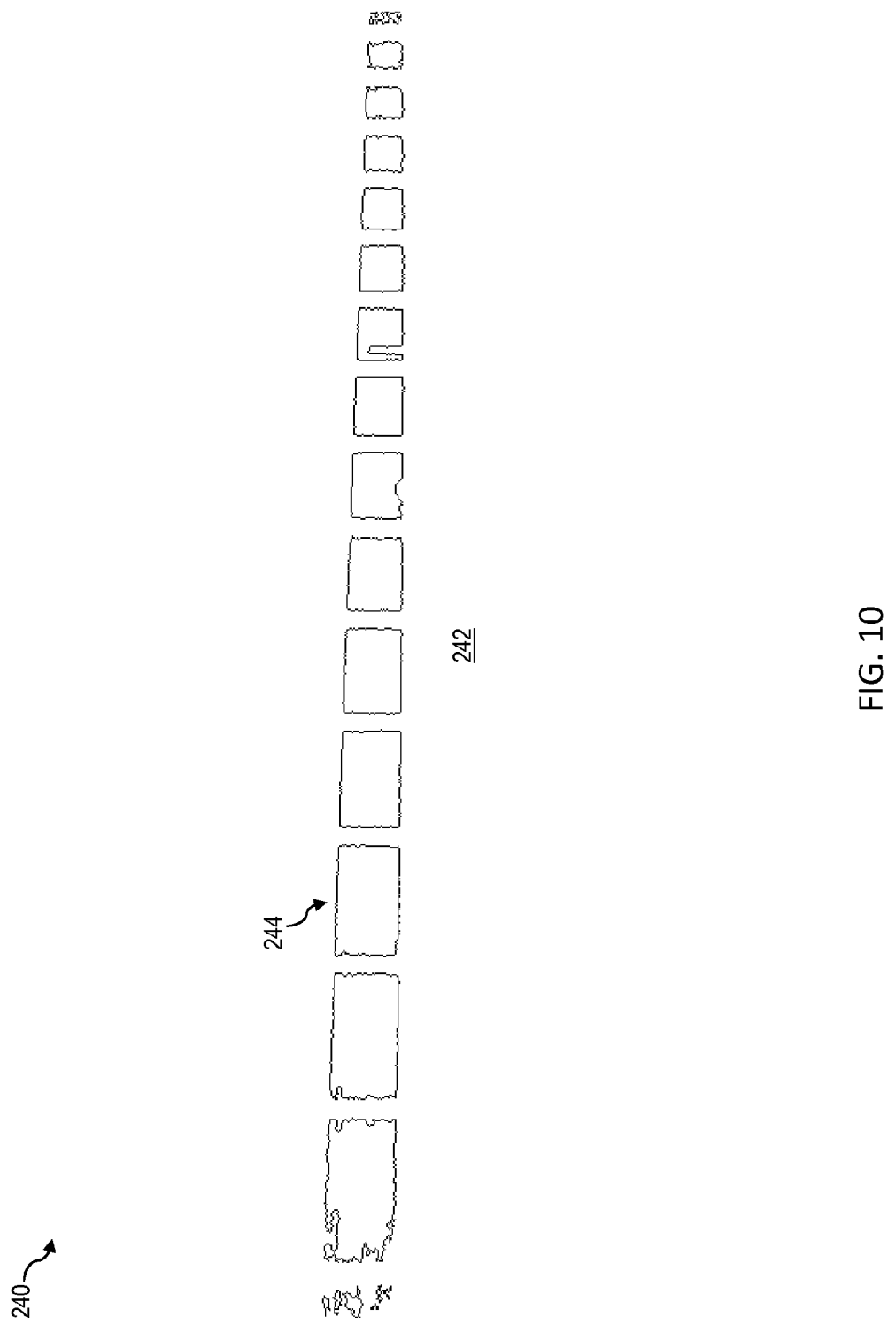
FIG. 10 schematically depicts an input image showing a row of skylights according to one or more embodiments shown and described herein.

Referring collectively to FIGS. 2, 10 and 11, as is described in detail above, an input image 240 of a ceiling 242 with skylights 244 can be provided. It is noted that the skylights 244 are represented in FIGS. 10 and 11 as borders of detected raw skylight features for clarity. The input image 240 can be analyzed to determine a first edge line 246, a second edge line 248, and a centerline 250 of the skylights 244. For example, the CFE algorithm 10 can be utilized to extract the first edge line 246, the second edge line 248, the centerline 250, and associated end points from the input image 240. As is noted above, the centerline 250 can be utilized as a feature for localization and navigation, i.e., the centerline 250 can be compared to a corresponding mapped object and utilized by the EBL for vehicle navigational purposes.

Figure 11A:
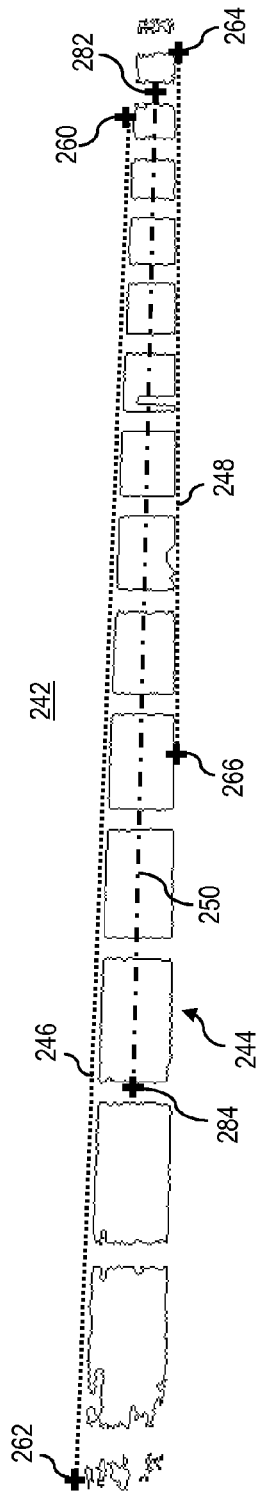
FIGS. 11A and 11B schematically depict edge lines and regions of interest overlaid upon the input image of FIG. 10 according to one or more embodiments shown and described herein.

Referring collectively to FIGS. 1, 10 and 11A, the embodiments described herein may be utilized in environments with various types and amounts of ceiling lights 114. For example, the ceiling 112 of the warehouse 110 can have an insufficient number of round lights 118 or merged lights 120 for use as features for navigation. For example, the input image 240 may not include any round lights 118 or merged lights 120. It has been discovered that the EBL may have decreased accuracy when provided with a feature set missing complementary point features extracted from round lights 118 or merged lights 120. That is, the centerline 250 extracted from the skylights 244 may not fully constrain the localization of the vehicle 100 and lead to inaccurate solutions. For example, the EBL may be unable to accurately determine how far along the centerline 250 the vehicle 100 is positioned.

Referring collectively to FIGS. 1 and 4, the skylights 116 can span a section of the ceiling 112 and be arranged substantially along a row 128. In some embodiments, the process skylights function 30 can be modified such that in addition to extracting centerline features from the skylights 116 as an EBL feature, the process skylights function 30 can further comprise a point fix function 40 for extracting point fix features. For example, point fix features can be extracted from the corners 130 of the skylights 116. The point fix features can enable the EBL to perform accurately for skylight-heavy, round-light sparse sites. Accordingly, instead of directly reporting the centerline features to the EBL following determination, the process skylights function 30 can extract point fix features using the centerline and edge line features as input.

Figure 12:
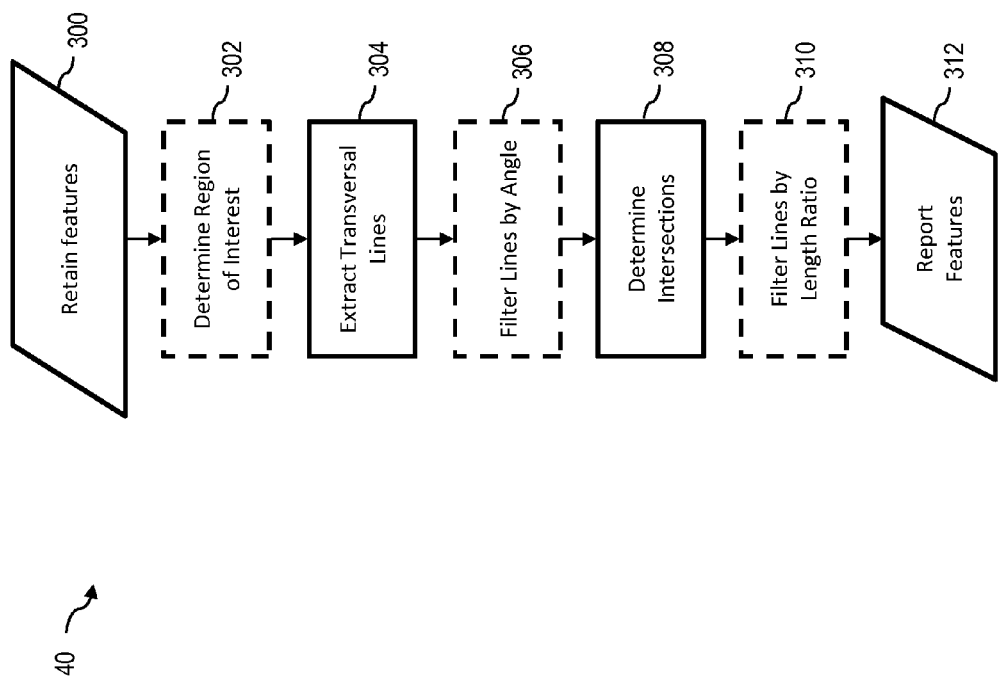
FIG. 12 depicts a flowchart of an exemplary algorithm for extracting point fixes according to one or more embodiments shown and described herein.

Referring now to FIG. 12, a flow chart of a sequence of functions for the point fix function 40 is schematically depicted. It is noted that, while the functions are enumerated and performed in a particular sequence in the depicted embodiment, the functions can be performed in an alternative order without departing from the scope of the present disclosure. Specifically, in some embodiments, it may be desirable to switch the order of the angle filtering function 306 and the length filtering function 310. In some embodiments, the angle filtering function 306 can be performed prior to the intersection function 308. It is furthermore noted that one or more of the functions can be omitted without departing from the scope of the embodiments described herein. Specifically, the angle filtering function 306, the length filtering function 310, or both the angle filtering function 306 and the length filtering function 310 can be omitted. Furthermore, it is noted that the region of interest function 302 can be omitted without departing from the scope of the embodiments described herein. Alternatively or additionally, the point fix function 40 can be performed independent of the CFE algorithm 10 and the process skylights function 30. For example, input for the point fix function 40, which is described in greater detail herein, can be provided via equivalent processes that are performed at a different time, via a different processor as the point fix function 40, or both.

Referring collectively to FIGS. 4, 11A and 12, at step 300 the point fix function 40 can receive input features such as, for example, the first edge line 246, the second edge line 224, the centerline 250 of the skylights 244, or combinations thereof. As is noted above, each of the first edge line 246, the second edge line 224, the centerline 250 can be provided as line segments. Accordingly, the first edge line 246 can be demarcated by a first end point 260 and a second end point 262. The second edge line 224 can be demarcated by a first end point 264 and a second end point 266. The centerline 250 can be demarcated by a first end point 282 and a second end point 284. In some embodiments, the first edge line 246, the second edge line 224, the centerline 250, and corresponding end points can be provided by the process skylights function 30 after the centerline calculating function 38 is performed. Alternatively or additionally, the first edge line 246, the second edge line 224, the centerline 250, and corresponding end points can be provided via a separate process and provided as direct input.

Figure 13:
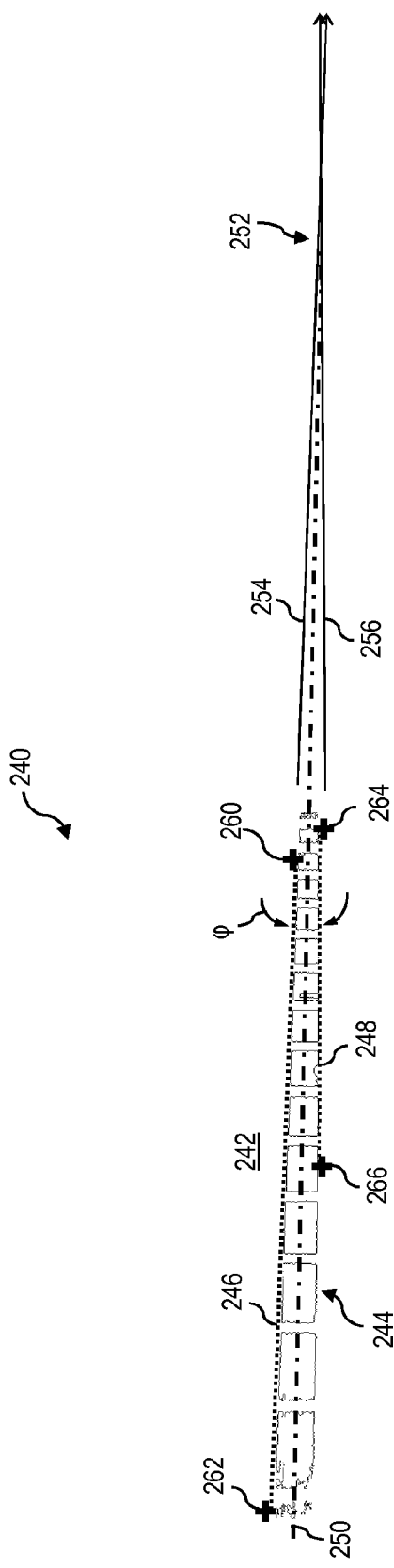
FIG. 13 schematically depicts edge lines of the input image of FIG. 10 according to one or more embodiments shown and described herein.

Referring collectively to FIGS. 4, 12 and 13, each of the first edge line 246, the second edge line 224, and the centerline 250 can be provided as line segments. In some embodiments, the first edge line 246, the second edge line 224, the centerline 250, and the vanishing point 252 of the skylights 244 can be provided by the process skylights function 30 after the centerline calculating function 38 is performed. Alternatively or additionally, the first edge line 246, the second edge line 224, the centerline 250, and the vanishing point 252 of the skylights 244 can be provided via a separate process and provided as direct input.

The first edge line 246 and the second edge line 248 are depicted in FIG. 13 as being overlaid upon the skylights 244. The first edge line 246 and the second edge line 224 can be longitudinal edge line segments that extend longitudinally along the skylights 244. When extrapolated beyond the depicted longitudinal segments, the first edge line 246 and the second edge line 224 can converge at a vanishing point 252, which is located off of the input image 240 of FIG. 10. Specifically, the first edge line 246 can be extended by a first extrapolating ray 254 that is aligned with the first edge line 246. The second edge line 248 can be extended by a second extrapolating ray 256 that is aligned with the second edge line 248. Each of the first extrapolating ray 254 and the second extrapolating ray 256 can be extended to at least the vanishing point 252 to represent the convergence of the first edge line 246 and the second edge line 224.

The centerline 250 of the skylights 244 can be disposed between the first edge line 246 and the second edge line 248. In some embodiments, the centerline 250 can be represented as a continuous line that originates at the vanishing point 252 of the first edge line 246 and the second edge line 248 at an angle that bisects the first edge line 246 and the second edge line 248. Specifically, the first edge line 246 and the second edge line 224 can be oriented with respect to one another at an angle $\phi$. Accordingly, the angle of the centerline 250 can be about half of the angle $\phi$ measured from the first edge line 246 or the second edge line 248. It is noted that the first extrapolating ray 254 and the second extrapolating ray 256 are provided herein primarily for clarifying the location of the vanishing point 252. Accordingly, it should be understood that the embodiments described need not make use of such rays for determining the vanishing point 252. Indeed, it may be preferred to determine the location of the vanishing point 252 directly from the first edge line 246 and the second edge line 248.

Referring collectively to FIGS. 11A-12, the point fix function 40 can comprise a region of interest function 302 for selecting a usable portion of the skylights 244 for determining point fix features. The region of interest function 302 can be utilized to increase the accuracy and efficiency of the point fix function 40. For example, it has been discovered that in sites with relatively high ceiling heights and long rows of lights the extracted centerlines may not fit to the center of the light across the whole image. Such errors may be caused by image distortion due to the camera lens, poor selection of edge segments to calculate the extracted centerline, or both. It has furthermore been discovered that the accuracy of the point fix function 40 can be increased by restricting the area of the skylights 244 with the region of interest function 302.

Generally, the region of interest 258 can be set to be coincident with a usable portion of the skylights 244, i.e., the area bounded by the region of interest 258 includes a subset of the skylights 244. In some embodiments, the region of interest 258 can be determined using the centerline 250 as a reference. Specifically, the centerline 250 can be utilized as an axial datum for the determination of the region of interest 258. For example, the region of interest 258 can be generated by a bounding box that is axis aligned with the centerline 250 and demarcated by the end points of the first edge line 246 and the second edge line 248 that bound the largest region. Accordingly, the region of interest 258 can be demarcated by the second end point 262 of the first edge line 246 and the first end point 264 of the second edge line 248, such that opposing corners of the region of interest 258 are set to the second end point 262 of the first edge line 246 and the first end point 264 of the second edge line 248.

Alternatively or additionally, a region of interest 259 that is more restrictive than the region of interest 258 can be determined using the centerline 250 as a reference. Specifically, the first end point 282 and the second end point 284 of the centerline 250 can be projected upon the first edge line 246 and the second edge line 248 to create intersection points 286. Optionally, the first edge line 246 and the second edge line 248 can be extrapolated to determine the intersection points 286. Accordingly, the region of interest 259 can be demarcated by one or more of the intersection points 286. Specifically, opposing corners of the region of interest 259 can be set to any two of the intersection points 286 such as, but not limited to, the intersection points 286 that result in the largest area, the intersection points 286 that result in the smallest area, or the intersection points 286 that result in each of the intersection points 286 being coincident with the region of interest 259.

Figure 11B:
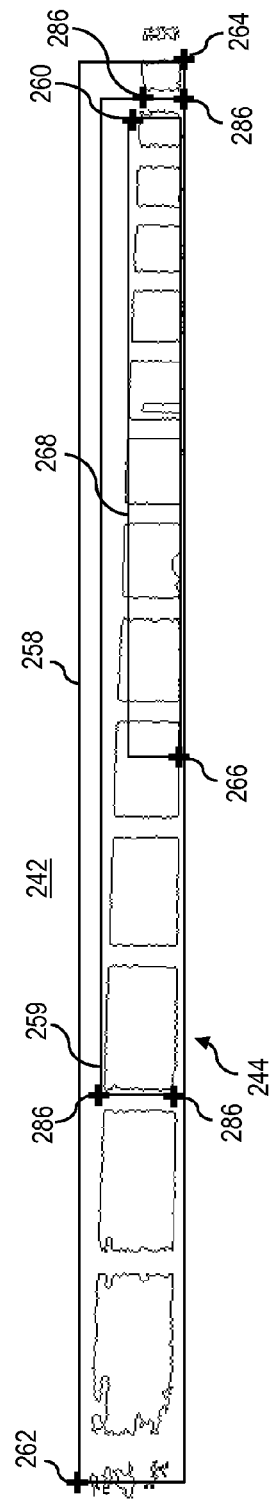

Referring collectively to FIGS. 11B and 13, the region of interest 258 can be determined using the vanishing point 252, the first edge line 246, and the second edge line 248. For example, the region of interest 258 can be determined by calculating the distance between endpoints of the first edge line 246 and the second edge line 248 with respect to the vanishing point 252. Specifically, the first end point 260 of the first edge line 246 can be closer to the vanishing point 252 than the second end point 262 of the first edge line 246. The first end point 264 of the second edge line 248 can be closer to the vanishing point 252 than the second end point 266 of the second edge line 248.

In some embodiments, the region of interest 258 can be set between end points of the first edge line 246, and the second edge line 248 that are the maximum distance from the vanishing point 252 and minimum distance from the vanishing point 252. Specifically, as depicted in FIG. 13, the second end point 262 of the first edge line 246 can be the end point of the first edge line 246 and the second edge line 248 that is the maximum distance from the vanishing point 252. The first end point 264 of the second edge line 248 can be the end point of the first edge line 246 and the second edge line 248 that is the maximum distance from the vanishing point 252. Accordingly, the region of interest 258 can be demarcated by the second end point 262 of the first edge line 246 and the first end point 264 of the second edge line 248. For example, the region of interest 258 can bound a substantially rectangular area that is coincident with the skylights 244, such that opposing corners of the region of interest 258 are set to the second end point 262 of the first edge line 246 and the first end point 264 of the second edge line 248.

Referring again to FIGS. 11A, 11B and 13, a region of interest 268 can be demarcated by an overlapping portion of the first edge line 246 and the second edge line 248. Generally, the region of interest 268 is the most restrictive region of interest described herein. The overlapping portion can be defined by the end points of the first edge line 246 and the second edge line 248. In some embodiments, the region of interest 268 can be defined by an axis aligned bounding box that is demarcated by the end points of the first edge line 246 and the second edge line 248 that result in the smallest area. Accordingly, the region of interest 268 can be include the overlapping portion demarcated by the first end point 260 of the first edge line 246 and the second end point 266 of the second edge line 248.

Alternatively or additionally, the region of interest 268 can be determined utilizing the vanishing point 252. Specifically, each of the first edge line 246 and the second edge line 248 can each have a proximal end point nearest the vanishing point 252, depicted in FIG. 13 as the first end point 260 and the first end point 264. Each of the first edge line 246 and the second edge line 248 can have a distal end point furthest from the vanishing point 252, depicted in FIG. 13 as the first end point 260 and the first end point 264. The region of interest 268 can be demarcated by the proximal end point furthest from the vanishing point 252 and the distal end point nearest the vanishing point 252. Specifically, as depicted in FIG. 13, the first end point 260 of the first edge line 246 can be selected as the proximal end point furthest from the vanishing point 252. The second end point 266 of the second edge line 248 can be selected as the distal end point nearest the vanishing point 252.

Selecting the region of interest 268 to include overlapping portions can further increase the accuracy of the point fix function. Indeed, it may be desirable to alter the centerline calculating function 38 (FIG. 4) to increase the likelihood of edge line segment pairs having large amounts of overlap. Specifically, the edge pairing of the centerline calculating function 38 can select the line segment with the most votes as the primary edge and the second edge can be selected by searching for the highest voted line with similar angle and suitable distance from the primary edge. As there can be several suitable second edge candidates, which meet the angle and distance requirements, the suitable second edge candidates can be weighted according to amount of overlap with the primary line. Accordingly, the second edge candidates can receive additional votes based upon amount of overlap with the primary edge.

Figure 14:
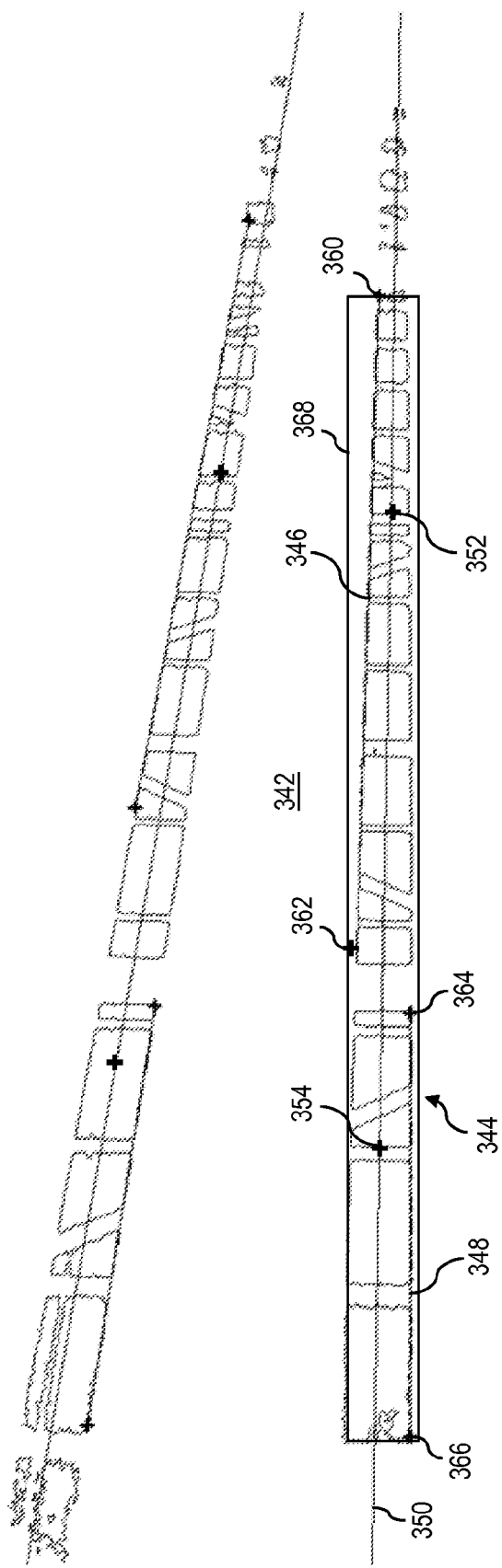
FIG. 14 schematically depicts an input image showing a multiple rows of skylights according to one or more embodiments shown and described herein.
Figure 15A:
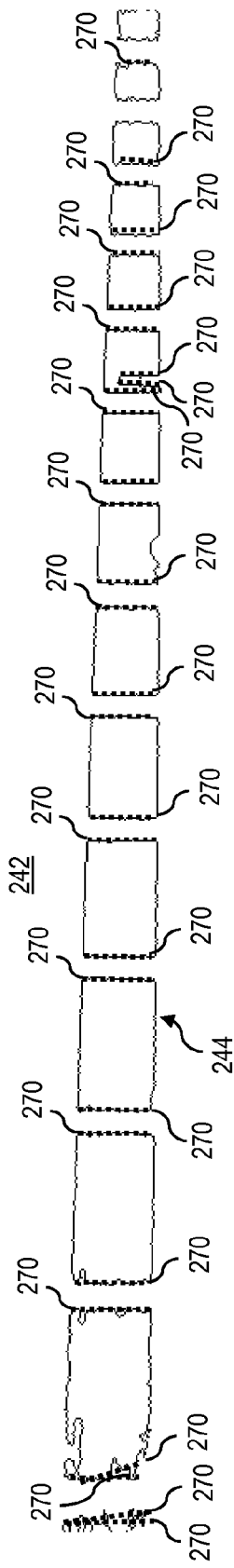
FIGS. 15A and 15B schematically depict transversal edges of the input image of FIG. 10 according to one or more embodiments shown and described herein.
Figure 15B:
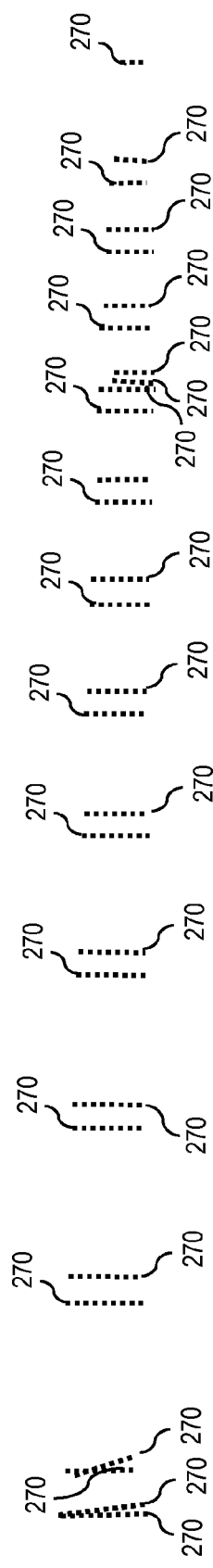
Figure 16A:
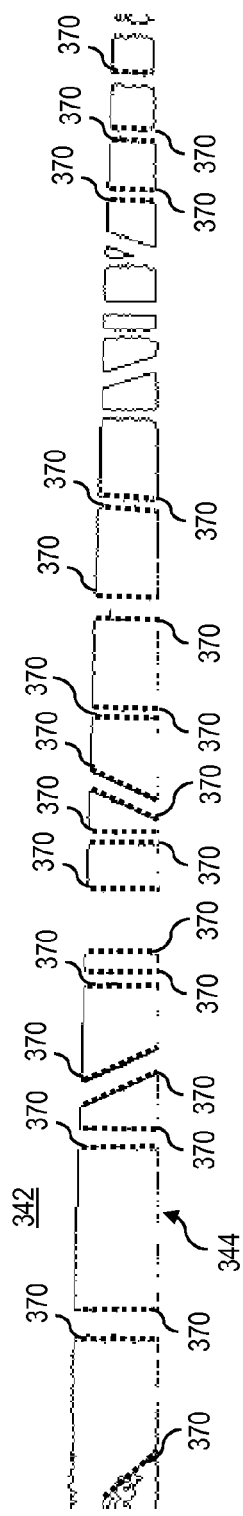
FIGS. 16A and 16B schematically depict transversal edges of the input image of FIG. 14 according to one or more embodiments shown and described herein.
Figure 16B:
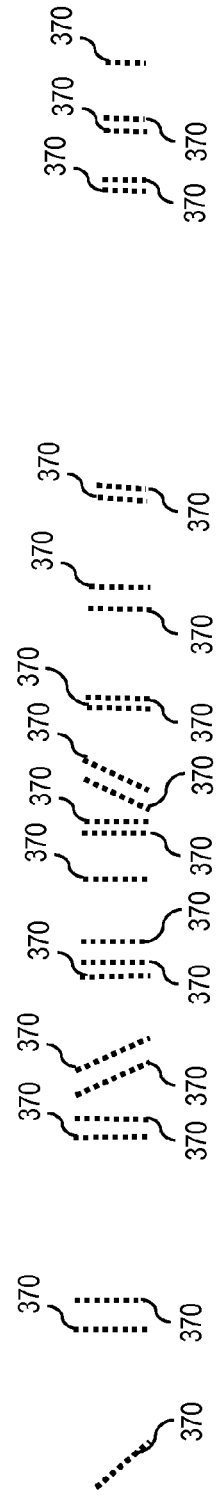

Referring collectively to FIGS. 12 and 14, in some embodiments, a first edge line 346 and a second edge line 348 of skylights 344 of a ceiling 342 may not overlap with respect to the centerline 350. Specifically, using the centerline 350 as an axial datum, a projection normal to the centerline 350 does not intersect both the first edge line 346 and the second edge line 348 of the skylights 344. Upon determining that no overlap exists, the point fix function 40 can terminate and report that there are no point fixes. Alternatively, the region of interest function 302 can utilize a less restrictive region of interest for selecting a usable portion of the skylights 344 for determining point fix features. In some embodiments, the less restrictive region of interest can be determined using the centerline 350, a first end point 352 of the centerline 350, a second end point 354 of the centerline 350, or combinations thereof, as is described herein above.

Alternatively or additionally, it may be desirable to select a region of interest 368 that is coincident with the full extent of the first edge line 346 and the second edge line 348 of the skylights 344. The first edge line 346 can be demarcated by a first end point 360 and a second end point 362, and the second edge line 348 can be demarcated by a first end point 364 and a second end point 366. Accordingly, the region of interest 358 can be set such that the first end point 360 and the second end point 362 of the first edge line 346 as well as the first end point 364 and the second end point 366 of the second edge line 348 are bounded by the region of interest 368.

Referring collectively to FIGS. 12, 11B, 15A and 15B, the point fix function 40 can comprise a transversal line extraction function 304 for extracting transversal edges 270 from the skylights 244. The transversal line extraction function 304 can comprise the feature extraction algorithm, described herein above, such as, but not limited to, the Hough Transform. The transversal line extraction function 304 can be configured to extract line segments from the skylights 244 that have a vertical component with respect to the centerline 250. That is the extracted line segments can be characterized by a vector having a component that is substantially orthogonal to the centerline 250. For example, the Hough transform can be applied with appropriate parameters to detect transversal edges 270 of the skylights 244.

In some embodiments, the transversal edges 270 that are coincident with the region of interest 258 can be preferred. For example, the transversal line extraction function 304 may only extract lines from the portion of the skylights 244 that are within the region of interest 258. Alternatively or additionally, the transversal line extraction function 304 may operate on skylights 244 outside of the region of interest 258 and filter the extracted lines to obtain only transversal edges 270 that are coincident with the region of interest 258. Accordingly, the transversal edges 270 of the portion of the skylights 244 that are coincident with the region of interest 258 can be detected by the transversal line extraction function 304. It is noted that, for clarity, the transversal edges 270 are depicted as being overlaid upon the skylights 244 in FIG. 15A and the transversal edges 270 are depicted in isolation in FIG. 15B.

Referring collectively to FIGS. 12, 14, 16A and 16B, the transversal edges 370 of the portion of the skylights 344 that are coincident with the region of interest 368 can be detected by the transversal line extraction function 304, as described above. It is noted that, for clarity, the transversal edges 370 are depicted as being overlaid upon the skylights 344 in FIG. 16A and the transversal edges 370 are depicted in isolation in FIG. 16B.

Referring collectively to FIGS. 12, 17A and 17B, the point fix function 40 can comprise the angle filtering function 306 for classifying the transversal edges 270 as usable edges 272 and unusable edges 274. Specifically, it is noted that, while the transversal line extraction function 304 can be configured to primarily detect transversal edges 270 within a range approximately perpendicular to the angle of the centerline 250, some incorrect or undesirable lines may be detected. Accordingly, it may be desired to remove unusable edges 274 from the transversal edges 270. The unusable edges 274 can be the transversal edges 270 having an angle with respect to the centerline 250 that is outside of a restricted range of angles on either side of the average angle of all of the transversal edges 270. Alternatively or additionally, the usable edges 272 can be the transversal edges 270 having an angle with respect to the centerline 250 that is within the restricted range of angles on either side of the average angle of all of the transversal edges 270 with respect to the centerline 250. It is noted that, for clarity, the transversal edges 270 are depicted as being overlaid upon the skylights 244 in FIG. 17A and the transversal edges 270 are depicted in isolation in FIG. 17B.

Referring collectively to FIGS. 12, 18A and 18B, the angle filtering function 306 can classify the transversal edges 370 as usable edges 272 and unusable edges 274 by using the centerline 350, as described above. It is noted that the unusable edges 274 of the transversal edges 370 can correspond to diagonal beams traversing the skylights 344. Accordingly, the angle filtering function 306 can be utilized to remove features associated with diagonal beams or other obstructions. It is noted that, for clarity, the transversal edges 370 are depicted as being overlaid upon the skylights 344 in FIG. 18A and the transversal edges 370 are depicted in isolation in FIG. 18B.

Figure 19:
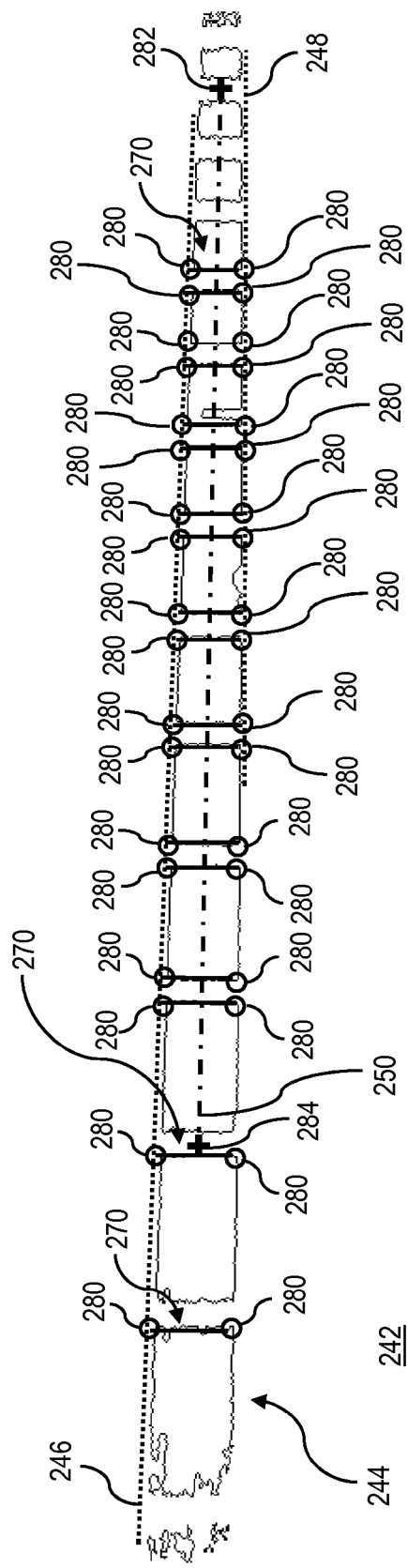
FIG. 19 schematically depicts point fixes overlaid upon the input image of FIG. 10 according to one or more embodiments shown and described herein.

Referring collectively to FIGS. 12 and 19, the point fix function 40 can comprise the intersection function 308 for determining points of convergence between the transversal edges 270 and the first edge line 246, the transversal edges 270 and the second edge line 248, or both. In embodiments where the transversal edges 270 are classified as usable edges 272, the transversal edges 270 that are classified as usable edges 272 can be utilized to determine points of convergence. The points of convergence can be determined by extrapolating the transversal edges 270. Specifically, the transversal edges 270 can be extrapolated by extending each of the transversal edges 270 along their length at least until the extrapolation intersects with the first edge line 246, the second edge line 248 or both the first edge line 246 and the second edge line 248. Optionally, the first edge line 246 and the second edge line 248 can be extrapolated to determine the points of intersection. Each of the points of convergence can be selected as a point fix 280.

Referring collectively to FIGS. 12, 17A, 17B and 19, the point fix function 40 can comprise the length filtering function 310 for filtering the transversal edges based upon a length ratio. The length filtering function 310 can be utilized to remove the transversal edges 270 that do not cross a panel of the skylights 244 to a desired extent. For example, each transversal edge 270 can be compared to corresponding points of convergence, i.e., the points of convergence that were determined from the transversal edge 270. Specifically, any transversal edges 270 with a length ratio below a threshold level may be removed, where the length ratio is given by the ratio of length (transversal edge):length (span between points of convergence). Accordingly, the point fixes 280 can be selected from the points of convergence of the remaining transversal edges 270, i.e., the transversal edges 270 that were not removed. It is noted that the length filtering function 310 was utilized to ensure that none of the point fixes 280 was selected from the short edges 276, i.e., the transversal edges 270 classified as short edges 276 were removed from consideration for point fixes 280.

The point fix function 40 can comprise a feature reporting function 312 for reporting the extracted features to the EBL. Specifically, the feature reporting function 312 can report the centerline 250 and the point fixes 280 to the EBL for use for navigation. Specifically, the EBL can compare the centerline 250 and the point fixes 280 to corresponding features in a map for navigational purposes. Additionally, for each reported point pair (i.e., derived from the one of the transversal edges 270) of the point fixes 280, a flag could be added denoting whether the point fix 280 sits on a transition of dark (between panels of the skylights 244) to bright (panels of the skylights 244) pixels or bright to dark pixels. The flag can be utilized to increase the accuracy of the EBL and reduce the chance of aliasing between an adjacent pair of points. The flag labeling of dark-to-bright versus bright-to-dark transitions could be achieved by scanning along the centerline 250 and averaging a set of points on either side of each point fix 280 to detect whether it is a dark or bright patch.

Referring collectively to FIGS. 1 and 19, the skylights 116 may be separated by structural objects of the warehouse 110 having a finite depth such as, for example, cross beams between the skylights 116. Accordingly, the structural objects may occlude the true corners 130 of the skylights 116, i.e., the structural object may be located between the camera 102 and the skylight 116. In some embodiments, it may be preferred for the EBL to use the point fixes 280 for which the camera 102 has direct line of sight. Thus, the EBL can utilize point fixes 280 and associated flags to determine whether it is likely that the point fix 280 corresponds to a corner 130 of a skylight 116 or is occluded.

It should now be understood that embodiments described herein can be utilized to navigate the industrial vehicle through the warehouse utilizing the centerline and a set of point fixes. Moreover, the embodiments described herein can have particular utility in buildings, e.g., warehouses that are round light sparse or lighted primarily by skylights and natural sources of illumination. Accordingly, the point fixes and centerlines described herein can be utilized to increase the environmental efficiency of a warehouse. For example, during day light hours the use of electricity can be reduced because the industrial vehicles described herein can be navigated through the use of naturally illuminated skylights. Moreover, the embodiments described herein can increase the accuracy and computational efficiency of the EBL through the use of centerlines and point fixes. Accordingly, the EBL can operate more rapidly given a fixed amount of computing power. Moreover, the increased accuracy of the EBL can reduce the environmental costs of operating a warehouse with industrial vehicles, i.e., mileage caused by localization error can be mitigated, which can reduce the power consumed by the industrial vehicle and the maintenance costs of the industrial vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An industrial vehicle comprising a camera and one or more processors, wherein:
   the camera is communicatively coupled to the one or more processors;
   the camera is mounted to the industrial vehicle and focused to a ceiling of a warehouse;
   the camera captures an input image of ceiling lights of the ceiling of the warehouse;
   the one or more processors execute machine readable instructions to:
      provide a first edge line and a second edge line of the ceiling lights of the input image;
      provide a centerline of the ceiling lights of the input image, wherein the centerline is disposed between the first edge line and the second edge line of the ceiling lights;
      detect transversal edges from the ceiling lights of the input image;
      determine points of convergence between the transversal edges and the first edge line and the second edge line;
      select a set of point fixes from the points of convergence; and
      navigate the industrial vehicle through the warehouse utilizing the centerline and the set of point fixes.

2. The industrial vehicle of claim 1, wherein the one or more processors execute the machine readable instructions to:
   set a region of interest that is coincident with a usable portion of the ceiling lights, wherein the transversal edges are detected from the usable portion of the ceiling lights.

3. The industrial vehicle of claim 2, wherein the region of interest is a bounding box that is axis aligned with the centerline.

4. The industrial vehicle of claim 3, wherein:
   the first edge line and the second edge line are line segments demarcated by end points; and
   the region of interest is demarcated by one or more of the end points of the first edge line and the second edge line.

5. The industrial vehicle of claim 3, wherein:
   the centerline is demarcated by end points; and
   the one or more processors execute the machine readable instructions to project the end points of the centerline upon the first edge line and the second edge line to create intersection points, and wherein the region of interest is demarcated by one or more of the intersection points.

6. The industrial vehicle of claim 2, wherein:
   the first edge line and the second edge line overlap to define an overlapping portion; and
   the region of interest is demarcated by the overlapping portion of the first edge line and the second edge line.

7. The industrial vehicle of claim 2, wherein:
   the first edge line and the second edge line converge at a vanishing point;
   the first edge line and the second edge line are line segments demarcated by end points; and
   the region of interest is determined utilizing the vanishing point.

8. The industrial vehicle of claim 1, wherein the transversal edges are detected using a Hough transform.

9. The industrial vehicle of claim 1, wherein the one or more processors execute the machine readable instructions to:
   determine an average angle of the transversal edges; and
   remove unusable edges from the transversal edges that are outside of a restricted range of angles on either side of the average angle of the transversal edges, whereby usable edges of the transversal edges remain, and wherein the set of point fixes are selected from the usable edges of the transversal edges.

10. The industrial vehicle of claim 1, wherein the points of convergence are determined by extrapolating the transversal edges.

11. The industrial vehicle of claim 10, wherein the points of convergence are determined by extrapolating the first edge line, the second edge line, or both.

12. The industrial vehicle of claim 10, wherein:
   the set of point fixes are selected from the transversal edges having a length ratio above threshold level; and
   the length ratio is given by a ratio of a length of each of the transversal edges to a length of a span between corresponding points of convergence.

13. The industrial vehicle of claim 1, wherein the one or more processors execute the machine readable instructions to:
   label a point fix of the set of point fixes as corresponding to a transition of dark-to-bright or bright-to-dark in the input image.

14. A method for navigating an industrial vehicle comprising:
   capturing an input image of skylights of a ceiling of a warehouse, wherein the input image is captured with a camera coupled to an industrial vehicle;
   extracting a first edge line and a second edge line from the skylights of the input image;
   determining a centerline of the skylights from the first edge line and the second edge line of the skylights, wherein the centerline is disposed between the first edge line and the second edge line of the skylights;
   detecting transversal edges from the skylights of the input image;
   determining points of convergence between the transversal edges and the first edge line and the second edge line of the skylights;
   selecting a set of point fixes from the points of convergence;
   determining a pose of the industrial vehicle, a position of the industrial vehicle, or both based upon the centerline and the set of point fixes; and navigating the industrial vehicle through the warehouse utilizing the pose, the position, or both.

15. The method of claim 14, further comprising:
extracting raw feature contours from the skylights of the input image;
determining a convex hull from the skylights of the input image, wherein the convex hull comprises hull line segments;
generating a mask from the hull line segments of the convex hull; and
selecting a selected portion from the raw feature contours, wherein the selected portion of the raw feature contours is coincident with the mask, and wherein the first edge line and the second edge line are extracted from the selected portion of the raw feature contours.

16. The method of claim 14, wherein extracting the first edge line and the second edge line from the skylights of the input image further comprising:
extracting line segments from the skylights of the input image;
selecting the first edge line from the line segments;
weighting the line segments based at least in part upon overlap with the first edge line; and
selecting the second edge line from the line segments based upon the weighting of the line segments.

17. The method of claim 14, further comprising:
setting a region of interest that is coincident with a usable portion of the skylights, wherein the transversal edges are detected from the usable portion of the skylights.

18. The method of claim 17, further comprising using the centerline as a reference to set the region of interest.

19. The method of claim 14, further comprising:
determining an average angle of the transversal edges; and
removing unusable edges from the transversal edges that are outside of a restricted range of angles on either side of the average angle of the transversal edges, whereby usable edges of the transversal edges remain, and wherein the set of point fixes are selected from the usable edges of the transversal edges.

20. The method of claim 14, further comprising:
labeling a point fix of the set of point fixes as corresponding to a transition of dark-to-bright or bright-to-dark in the input image.

* * * * *